(12) United States Patent
Lo et al.

(10) Patent No.: US 9,224,063 B2
(45) Date of Patent: Dec. 29, 2015

(54) APPARATUS AND METHOD FOR DIGITAL MICROSCOPY IMAGING

(75) Inventors: Hok Man Herman Lo, Richmond (CA); Li-Heng Lin, Vancouver (CA); Benjamin Thomas Cecchetto, Vancouver (CA); Mohammadhossein Afrasiabi, Vancouver (CA); Sebastien Lallement, Verzy (FR)

(73) Assignee: ViewsIQ Inc., Richmond, British Columbia (CA)

( * ) Notice: Subject to any disclaimer, the term of this patent is extended or adjusted under 35 U.S.C. 154(b) by 145 days.

(21) Appl. No.: 14/236,580

(22) PCT Filed: Aug. 2, 2012

(86) PCT No.: PCT/CA2012/050525
§ 371 (c)(1),
(2), (4) Date: May 28, 2014

(87) PCT Pub. No.: WO2013/016825
PCT Pub. Date: Feb. 7, 2013

(65) Prior Publication Data
US 2014/0270537 A1    Sep. 18, 2014

Related U.S. Application Data

(60) Provisional application No. 61/514,186, filed on Aug. 2, 2011.

(51) Int. Cl.
*G06K 9/46* (2006.01)
*G06K 9/62* (2006.01)
(Continued)

(52) U.S. Cl.
CPC .............. *G06K 9/46* (2013.01); *G06K 9/6201* (2013.01); *G06T 3/4038* (2013.01); *G06T 11/60* (2013.01); *G06T 15/20* (2013.01); *G06K 2009/4666* (2013.01)

(58) Field of Classification Search
None
See application file for complete search history.

(56) References Cited

U.S. PATENT DOCUMENTS

| 4,631,750 A | 12/1986 | Gabriel et al. |
| 5,611,000 A | 3/1997 | Szeliski et al. |

(Continued)

FOREIGN PATENT DOCUMENTS

| EP | 134739 | 3/1985 |
| EP | 0200284 | 11/1986 |

(Continued)

OTHER PUBLICATIONS

European Application No. 12819182.2, Extended European Search Report Dated Feb. 26, 2015, 5 pgs.

(Continued)

*Primary Examiner* — Bhavesh Mehta
*Assistant Examiner* — David F Dunphy
(74) *Attorney, Agent, or Firm* — Curtis B. Behmann; Borden Ladner Gervais LLP

(57) ABSTRACT

A microscopy imaging system and method for rendering a mosaic representation of an object from a series of image frames of the object are disclosed. A current image frame is processed to determine its relative location or position within the mosaic representation based on relative displacement of the current image from one or more keyframes. Once the current image frame's position has been determined, it is rendered along with its neighboring keyframes to provide the mosaic representation of the object.

35 Claims, 17 Drawing Sheets

(51) Int. Cl.
*G06T 11/60* (2006.01)
*G06T 15/20* (2011.01)
*G06T 3/40* (2006.01)

(56) References Cited

U.S. PATENT DOCUMENTS

| | | | |
|---|---|---|---|
| 5,706,416 | A | 1/1998 | Mann et al. |
| 5,926,190 | A | 7/1999 | Turkowski et al. |
| 6,075,905 | A * | 6/2000 | Herman et al. ............ 382/284 |
| 6,078,701 | A | 6/2000 | Hsu et al. |
| 6,124,864 | A | 9/2000 | Madden et al. |
| 6,173,087 | B1 | 1/2001 | Kumar et al. |
| 6,208,765 | B1 | 3/2001 | Bergen |
| 6,313,452 | B1 | 11/2001 | Paragano et al. |
| 6,597,818 | B2 | 7/2003 | Kumar et al. |
| 6,687,419 | B1 | 2/2004 | Atkin |
| 6,754,379 | B2 | 6/2004 | Xiong et al. |
| 7,006,124 | B2 | 2/2006 | Peleg et al. |
| 7,103,231 | B2 | 9/2006 | Cornog et al. |
| 7,106,361 | B2 | 9/2006 | Kanade et al. |
| 7,130,490 | B2 | 10/2006 | Elder et al. |
| 7,146,372 | B2 | 12/2006 | Bacus |
| 7,305,109 | B1 | 12/2007 | Gagnon et al. |
| 7,324,113 | B1 | 1/2008 | Rouet et al. |
| 7,456,377 | B2 | 11/2008 | Zeineh |
| 7,477,802 | B2 | 1/2009 | Milanfar et al. |
| 8,014,624 | B2 | 9/2011 | Olschewski |
| 2004/0071367 | A1 | 4/2004 | Irani et al. |
| 2004/0136582 | A1 | 7/2004 | Bacus et al. |
| 2005/0238198 | A1 | 10/2005 | Brown et al. |
| 2006/0045388 | A1 | 3/2006 | Zeineh et al. |
| 2007/0031062 | A1 * | 2/2007 | Pal et al. ................ 382/284 |
| 2008/0108870 | A1 | 5/2008 | Wiita et al. |
| 2008/0159653 | A1 | 7/2008 | Dunki-Jacobs et al. |
| 2008/0262312 | A1 | 10/2008 | Carroll et al. |
| 2008/0304727 | A1 | 12/2008 | Doyle |
| 2009/0091566 | A1 | 4/2009 | Turney et al. |
| 2009/0196526 | A1 | 8/2009 | Schmid et al. |
| 2011/0075914 | A1 | 3/2011 | Filkins et al. |
| 2012/0019614 | A1 * | 1/2012 | Murray et al. ............ 348/36 |
| 2012/0295231 | A1 * | 11/2012 | Zitnick et al. ............ 434/85 |
| 2014/0300686 | A1 * | 10/2014 | Campbell et al. ............ 348/36 |

FOREIGN PATENT DOCUMENTS

| | | |
|---|---|---|
| EP | 1008956 | 6/2000 |
| WO | 2006053271 | 5/2006 |
| WO | 2009026522 | 2/2009 |
| WO | 2010078394 | 7/2010 |
| WO | 2010086751 | 8/2010 |
| WO | 2010120231 | 10/2010 |
| WO | 2011127361 | 10/2011 |

OTHER PUBLICATIONS

Steedly et al., "Efficiently Registering Video into Panoramic Mosaics," Computer Vision, 2005, Tenth IEEE International Conference on Beijing, China, Oct. 17-20, 2015, Piscataway, NJ, USA, IEEE, Los Almitos, CA, USA, vol. 2, Oct. 17, 2005, 8 pgs.

Fadaeieslam et al., "Efficient Key Frames Selection for Panorama Generation from Video," Journal of Electronic Imaging, Jun. 8, 2011, 11 pgs.

Sawhney et al., "Robust Video Mosaicing through Topology Inference and Local to Global Alignment," European Conference on Computer Vision, Berlin, Germany, vol. 2, Jun. 1, 1998, pp. 103-119.

International Application No. PCT/CA2012/050525, International Preliminary Report on Patentability dated Aug. 19, 2013, 18 pgs.

Canadian Application No. 2,843,772, Notice of Allowance dated Sep. 4, 2014, 1 pg.

Gao et al. "Microscopy Image Focus Quality Assessment by Overlapping Tile Analysis", 2010 IEEE International Symposium on Biomedical Imaging From Nano to Macro. Conference Publications, Apr. 14-17, 2010, pp. 1129-1132.

International Patent Application No. PCT/CA2012/050525, International Search Report and Written Opinion dated Oct. 23, 2012.

Brown et al., "Automatic Panoramic Image Stitching Using Invariant Features", International Journal of Computer Vision, vol. 74, No. 1, retrieved online Apr. 7, 2014, pp. 59-73, 2007.

Chariot et al., "GPU-boosted online image matching", 19th International Conference on Pattern Recognition—ICPR, Tampa, United States, 2008, retrieved online Apr. 7, 2014, 4 pages.

* cited by examiner

APPARATUS AND METHOD FOR DIGITAL MICROSCOPY IMAGING

CROSS REFERENCE TO RELATED APPLICATIONS

This application claims the benefit of priority of U.S. Provisional Patent Application No. 61/514,186 filed Aug. 2, 2011, which is incorporated herein by reference in its entirety.

FIELD

The present disclosure relates generally to digital imaging. More particularly, the present disclosure relates to rendering of images in the field of microscopy.

BACKGROUND

Typically, images of an object acquired through a microscope are limited by the field of view of the microscope used. Attempts have been made to provide a larger digital image of the object using a mosaic or a montage of smaller digital images. In order to render the mosaic image, the location of the smaller images with respect to each other and the final mosaic image must be determined.

U.S. Pat. No. 6,687,419 to Atkin describes a method in which a current image is located within a mosaic image by shifting the current image across the montage image while continuously computing the co-variance of corresponding pixels to determine a position for the current image that maximizes the co-variance.

Determination of the location of individual images that make up the mosaic image and generation of the mosaic image for rendering on a display are computationally intensive. Improvements to means of generating an interactive, accurate large mosaic representation of a microscopic landscape that is not limited by the field of view of the microscope is desirable.

SUMMARY

In an aspect of the present disclosure there is provided a method for rendering a mosaic representation of an object from a series of image frames of the object. The method comprises acquiring a current image frame of the object and determining a current image frame tracking position of the current image frame based on a previous image frame position of a previous image frame and a relative displacement of the current image frame from the previous image frame; identifying at least one neighboring keyframe within a search area defined relative to the current image frame tracking position, the at least one neighboring keyframe being one of a plurality of keyframes stored in a keyframe database, each keyframe having an associated keyframe position; determining relative displacements of the current image frame from each of the at least one neighboring keyframes; storing the current image frame as a new keyframe in the keyframe database upon determining that each of the relative displacements of the current image frame from each of the at least one neighboring keyframes is greater than a threshold value; determining current image frame positions of the current image frame based on the keyframe frame positions of each of the at least one neighboring keyframes and the relative displacement of the current image frame from each of the at least one neighboring keyframes; storing an average of the current image frame positions as a new keyframe position associated with the new keyframe in the keyframe database; rendering the keyframes from the keyframe database on a display at their respective associated keyframe positions to obtain the mosaic representation of the object.

The relative displacements of the current image frame from each of the at least one neighboring keyframes may also be stored along with new keyframe.

The method may further comprise adjusting the keyframe positions of the plurality of keyframes to correct errors in the keyframe positions based on optimization of each keyframe position to satisfy one or more constraints on the relative displacements of each keyframe with its neighboring keyframes. Upon failure to identify at least one neighboring keyframe within the search area or upon failure to determine the relative position of the current image frame to any neighboring keyframe, the search area may be iteratively increased to identify at least one neighboring keyframe. Upon failure to identify at least one neighboring keyframe after iteratively increasing the search area, the current image frame position may be assigned to be the current image frame tracking position or to be the previous image frame position.

The method may further comprise identifying a set of features in each of the series of image frames by setting a feature strength threshold; obtaining a list of potential features, the list including at least one potential feature that exceeds the feature strength threshold; identifying the set of features in each of the series of image frames by selecting from the list of potential features only features having the maximum feature strength within a pre-defined neighborhood region.

The relative displacement of the current image frame from the previous image frame may be determined by registering the current image frame and the previous image frame based on at least one feature in the current image frame and the previous image frame.

The relative displacements of the current image frame from each of the at least one neighboring keyframes may be determined by registering the current image frame and each of the at least one keyframe based on the at least one feature in the current image frame and each of the at least one neighboring keyframes.

Registering the current image frame and each of the at least one neighboring keyframes may include: matching a set of features identified in the current image frame with a corresponding set of features in each of the at least one neighboring keyframes to obtain a set matched feature pairs; selecting acceptable matched feature pairs from the set of matched feature pairs; and determining average displacement between the current image frame and each of the least one neighboring keyframes based on the relative displacement of the acceptable matched feature pairs for image registration.

Each identified feature may include a descriptor row vector of N elements, N being an integer. The matching of the set of features and selecting acceptable matched feature pairs may comprise: comparing the descriptor row for each feature in the set of features identified in the current image frame with the descriptor row vector of each feature in the corresponding set of features in each of the at least one neighboring keyframes; and identifying a best-match feature in the at least one neighboring keyframe for each feature in the current image frame, the best-match feature having the least descriptor distance from the feature in the current image frame.

Each identified feature may also include a coordinate, an orientation parameter, a scale parameter. The matching of the set of features and selecting acceptable matched feature pairs may comprise: determining a set of match candidates for each feature in the set of features identified in the current image frame from the corresponding set of features in each of the at least one neighboring keyframes, each match candidate having its orientation parameter and scale parameter similar to that of the corresponding feature in the current image frame; and identifying a best-match feature in the at least one neighboring keyframe based on a match candidate from the set of match candidates having the least descriptor distance from the feature in the current image frame.

The method may further comprise computing a feature displacement for each matched feature pair based on their respective x-coordinates and y-coordinates; accumulating computed feature displacements in a 2D histogram; and selecting the matched feature pairs accumulated in a bin having the highest accumulation in the 2D histogram and its neighboring bins as acceptable matched feature pairs.

The method may further comprise determining residual values of each matched feature pair from the average displacement; determining the average residual value for all matched feature pairs; and selecting the matched feature pairs having a residual value less than a threshold residual value as acceptable matched feature pairs.

Rendering the keyframes may further comprise: generating a set of texture atlases, each texture atlas having an associated resolution and including at least one keyframe downsampled at the associated resolution; selecting a display area and a display resolution for the rendering; selecting and updating a texture atlas having a resolution closest to the display resolution from the set of texture atlases; and rendering the keyframes from the texture atlas whose associated keyframe positions are within the display area.

Updating the texture atlas may include identifying a set of keyframes from the keyframe database having associated keyframe positions within the display area and not yet (or absent) in the texture atlas; downsampling the set of keyframes at the associated resolution of the texture atlas; and inserting the downsampled set of keyframes into the texture atlas.

Upon determining that at least one of the relative displacements of the current image frame from each of the at least one neighboring keyframes is less than the threshold value, the method may further comprise: identifying at least one neighboring keyframe whose relative displacement is less than the threshold value;
determining a region of overlap between the current image frame and the at least one neighboring keyframe to obtain a region of interest in each of the current image frame and the at least one neighboring keyframe; replacing the region of interest of the at least one neighboring keyframe with the region of interest of the current image frame when the region of interest of the current image frame is determined to be sharper than the region of interest of the one of the neighboring keyframes based on a image sharpness parameter.

The image sharpness parameter may be a gradient sum obtained from gradient images of the region of interest of the current image frame and the at least one neighboring keyframe, respectively, and the region of interest of the current image frame may be determined to be sharper than the region of interest of the one of the neighboring keyframes when the gradient sum of the region of interest of the current image frame is greater than that of the one of the neighboring keyframes.

Replacing the region of interest of the at least one neighboring keyframe may include overwriting contents of the region of interest of the at least one neighboring keyframe with that contents of the region of interest of the current image frame. The contents at the boundaries of the region of interest of the current image frame may be blended with those of the at least one neighboring keyframe.

The method may further comprise: assigning each keyframe in the keyframe database to one of a plurality of cells based on its associated keyframe position; and tagging each keyframe to map its associated keyframe position and its respective assigned cell. The plurality of cells may be aligned in a grid and the cells may be indexed using a 2-dimensional index. The search area may comprise at least one or indexed cells. Each of the at least one neighboring keyframes may be assigned to the at least one or more indexed cells.

Rendering of the mosaic representation of the object may include rendering mosaic representations obtained from different magnification objectives. The method may further comprise: maintaining a separate keyframe database associated with each magnification objective; associating the mosaic representations obtained from each magnification objective based on a relative displacement of respective objective optical centers; and rendering a combined mosaic representation of the object based on the associated mosaic representations.

The method may further comprise pre-processing the current image frame. The pre-processing may include image calibration to correct illumination variance across a field of view, conversion of color scales to a grayscale, downsampling, feature detection, or gradient computation.

Rendering the keyframes may comprises blending of overlapping keyframes. Blending of overlapping keyframes may include decomposing keyframes into a plurality of bands; blending the plurality of bands; and merging the blended plurality of bands to obtain the mosaic representation of the object. Decomposing keyframes may be based on spatial frequency.

The method may further comprise adjusting the gain of the current image frame to a substantially uniform level of brightness by comparing against the gains of the plurality of keyframes.

The method may further comprise detecting a occlusion in the current image frame based on an average image pixel intensity falling below a threshold intensity value; and detecting a change in an exposure time of subsequent image frames to determine a change in objective lens used for acquiring image frames.

A first image frame in the series of image frames may be assigned as a reference keyframe having a reference keyframe position.

In an aspect of the present disclosure there is provided an imaging system comprising an image acquisition module, a processor, and a renderer. The image acquisition module is configured to acquire a current image frame of an object. The processor configured is to: determine a current image frame tracking position of the current image frame based on a previous image frame position of a previous image frame and a relative displacement of the current image frame from the previous image frame; identify at least one neighboring keyframe within a search area defined relative to the current image frame tracking position, the at least one neighboring keyframe being one of a plurality of keyframes stored in a keyframe database, each keyframe having an associated keyframe position; determine relative displacements of the current image frame from each of the at least one neighboring keyframes; store the current image frame as a new keyframe in the keyframe database upon determining that each of the relative displacements of the current image frame from each of the at least one neighboring keyframes is greater than a threshold value; determine current image frame positions of the current image frame from the associated keyframe frame position of each of the at least one neighboring keyframes and the relative displacement of the current image frame from each of the at least one neighboring keyframes; store an average of the current image frame positions as a new keyframe position associated with the new keyframe in the keyframe database. The renderer renders the keyframes from the keyframe database on a display at their respective associated keyframe positions to display a mosaic representation of the object.

The image further comprises a controller to receive input from an input device or the processor to control the image acquisition module or the renderer in response to the received inputs, and the image acquisition module includes a microscope having at least one objective; and a video camera for acquiring a series of image frames of the object.

In an aspect of the present disclosure, there is provided a computer program product comprising a computer-readable memory storing computer executable instructions thereon that when executed by a computer perform the above described method for rendering a mosaic representation of an object from a series of image frames of the object.

In another aspect of the present disclosure, there is provided a method for generating keyframes from a series of image frames of an object for rendering a mosaic representation of the object. The method comprises: determining a current image frame tracking position based on a displacement of a current image frame relative to known position of a previous image frame; identifying at least one neighboring keyframe with a predetermined search area surrounding the current image frame tracking position; determining a current position of the current image frame relative to each of the at least one neighboring keyframe based on known respective keyframes positions of each of the at least one neighboring keyframes and relative displacements of the current image frame from each of the at least one neighboring keyframes; storing the current image frame as a new keyframe when the relative displacements of the current image frame from each of the at least one neighboring keyframes is greater than a threshold value.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for improving the efficiency in acquiring and rending a mosaic representation of an object from a series of image frames of the object. A current image frame is processed to determine its relative location or position within the mosaic representation based on relative displacement of the current image from one or more keyframes. Once the current image frame's position has been determined, it is rendered along with its neighboring keyframes to provide the mosaic representation of the object.

Figure 1:
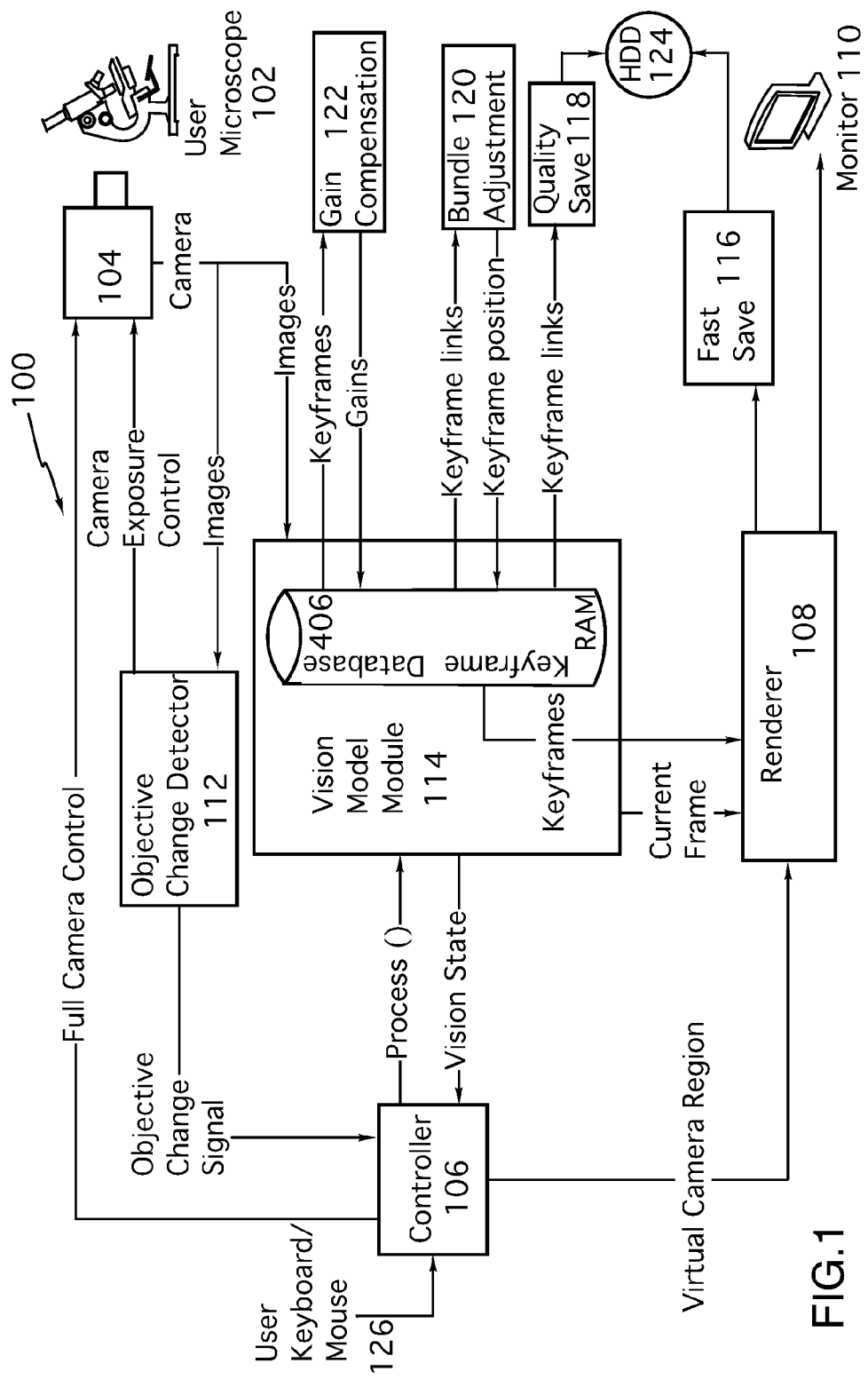
FIG. 1 is a high-level overview of an example arrangement of the system components in accordance with an embodiment of the present disclosure.

The system 100 according to certain embodiments of the present disclosure consists of a digital video camera 104 that is mounted on a microscope 102, a PC (not shown) for processing the video camera images, a display/monitor 110 for displaying the system output, and keyboard/mouse 126 for user input. The digital video camera 104 captures images in real-time as the user moves an object, for example a specimen mounted on a slide, on the microscope 102. Instructions and code executed on the PC processes these video images in real-time, stitching together the views seen through the microscope and creating a large mosaic. A high-level overview of an example arrangement of the system components are shown in FIG. 1.

The image processor can include three modules: a Vision Model Module 114, a Renderer 108, and a Controller 106. According to certain embodiments, the Vision Model Module 114 processes the digital images and may contain the image data. The Renderer 108 renders the image data in the Vision Model Module 114 on to the monitor 110. The Controller 106 handles user inputs, and controls the behavior of all other modules in the system 100.

According to certain embodiments of the present disclosure, the Vision Model Module 114 processes each incoming camera image frame. For each image frame, it estimates a frame position. The Vision Model Module 114 employs a concept of keyframes. According to this concept, only some of the incoming camera image frames are selected to be stored in the system 100. Selected frames are called keyframes. A keyframe is stored along with its estimated position in a keyframe database 406, for example, within the Vision Model module 114 as shown in FIG. 1. The keyframe database 406 may also be stored remotely from the Vision Model Module 114 or even remotely from the system 100. When the keyframe database is situated on a remote server, suitable communication (wired or wireless) to the keyframe database may be provided for the proper functioning of the system 100.

Other components of the system 100, including an objective change detector 112, fast save module 116, quality save module 118, bundle adjustment module 120, gain compensation module 122, and storage means, such as a hard disk drive (HDD) 124 are discussed in detail elsewhere in the present disclosure.

Figure 2:
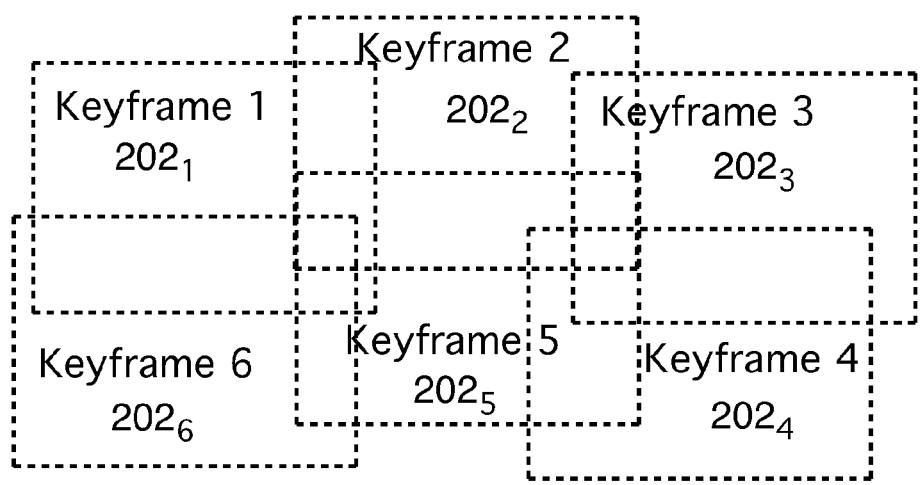
FIG. 2 is an example of a mosaic formed by rendering the keyframes in a keyframe database at their respective estimated positions according to a present embodiment.

The mosaic representation of the object is formed by rendering the keyframes in the database at their respective estimated positions. An example of a mosaic representations formed by rendering the keyframes $202_1$, $202_2$, ..., $202_5$ in the keyframe database 486 at their respective estimated positions is shown in FIG. 2.

According to certain embodiments of the present disclosure, the Renderer 108 draws or renders the keyframes in the keyframe database 406 at their respective position in an efficient manner. For example, the Renderer 108 may blend the overlapping regions of keyframes in real-time to realize processing efficiencies.

According to certain embodiments of the present disclosure, the Controller 106 receives user input and controls the behaviour of the camera 104 and other modules such as the Vision Model Module 114 or Renderer 108. For example, a user could use a mouse "drag" to change the region of mosaic he or she wants to see on the monitor 110. This mouse drag input is received by the Controller 106, which in turn changes the region of the mosaic that the Renderer 108 would render. The Controller 106 also monitors the state of the Vision Model Module 114. If the Vision Model Module 114 fails to determine the current image frame position, a warning to the user may be provided. The lost frame processing functionality is discussed in detail under the section "Lost Frame Processing."

Figure 3:
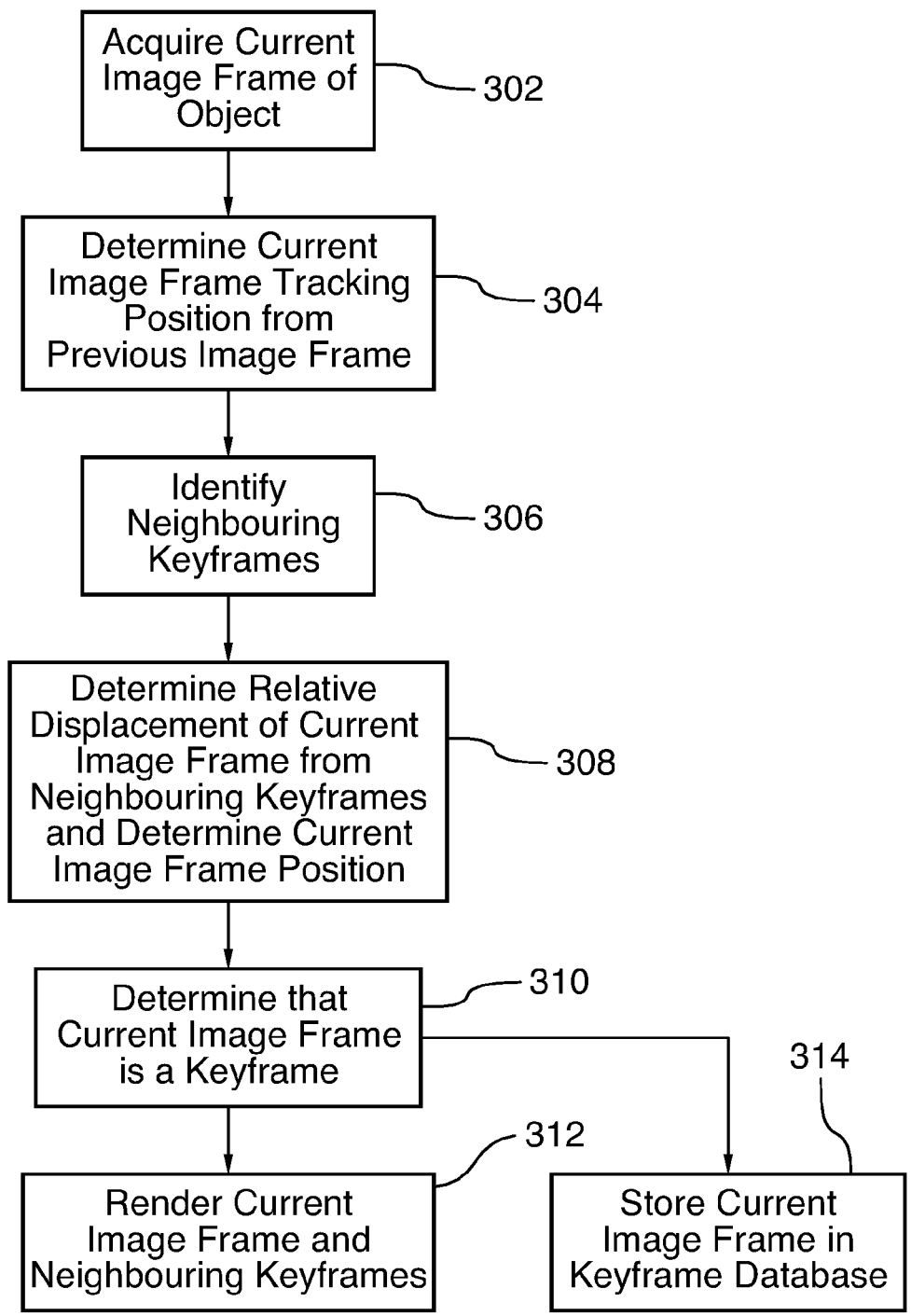
FIG. 3 is a flowchart of an example method for rendering a mosaic representation of an object from a series of image frames of the object according a present embodiment.

FIG. 3 is a flowchart of an example method for rendering a mosaic representation of an object from a series of image frames of the object. The method comprises acquiring a current image frame of the object at 302 and determining a current image frame tracking position of the current image frame based on a previous image frame at 304. This may include determining the current image frame tracking position as a function of a position of a previous image frame and a relative displacement of the current image frame from the previous image frame.

Based on the current image frame tracking position, at least one neighboring keyframe is identified at 306. The neighboring keyframes are defined as keyframes within a search area defined relative to the current image frame tracking position. The neighboring keyframes are identified from a plurality of keyframes stored in a keyframe database 426. Each keyframe in the keyframe database 426 has an associated keyframe position.

Once neighboring keyframes have been identified, relative displacements of the current image frame from each of the neighboring keyframes is determined at 308. In addition, the current image frame position relative to the neighboring keyframes is also determined at 308.

The current image frame and its neighboring keyframes are rendered as a mosaic representation of the object at 312. If the relative displacements of the current image frame from each of its neighboring keyframes is greater than a threshold value, the current image frame is stored as new keyframe in the keyframe database.

The following sections provide examples of the various components of example embodiments of above method in further detail.

Vision Model Module

As discussed above, the Vision Model Module 114 receives and processes camera image frames in real-time, and will be described in greater detail having regard to FIG. 4. the Vision Model Module 114 outputs an estimated current image frame position and keyframes and their estimated positions stored in a keyframe database to the Renderer 108 or other external modules. Generally, a keyframe is an image frame selected from the input stream of image frames to be stored permanently. The mosaic representation of the object is generated by rendering the keyframes at their estimated positions.

During initialization, the first camera image frame is stored as a reference keyframe. The reference keyframe is assigned to global position (0,0). An overview of the steps performed for normal processing of each image frame follows. Reference is made to FIGS. 4, 5A and 5B.

1) Preprocessing: Each incoming image frame, designated as current image frame in FIG. 4, may be pre-processed at 402 before it is used by the rest of the system 100 for improving the processing efficiency of the system. For example, the preprocessing of an image frame may include: (i) Static white image calibration to correct for illumination variance across the field of view. It also ensures that the input color image is white balanced; (ii) Grayscale conversion—the color image frame may be converted to grayscale image for ease of processing; (iii) Downsampling—the image frame may be downsampled to enable faster feature detection; (iv) Feature detection—feature detection may be performed on the downsampled image; and (v) Gradient Computation—the gradient image from the incoming image frame is computed and may be used for improving the quality of the rendered mosaic image, which is discussed under the section "Focus Replacement."

The features identified in the feature detection stage are used for image registration (linking). A feature detection technique using a Local Max Feature Detection approach will be described under the section "Local Max Feature Detection."

2) Linking To Nearby Keyframes: Each incoming image frame is then linked to nearby keyframes at 404. As used herein, the term "linking" of two frames is defined as performing image registration (discussed below under the section "Image Registration") between the two frames and obtaining their relative displacement. As shown in the illustration of the linking process in FIG. 5A, when Frame 1 (for example, a previous image frame 504) is linked to Frame 2 502 (for example, current image frame 502), the displacement vector $I_{1,2}$ between the two frames is found. In the Linking to Nearby Keyframes step, as illustrated in FIG. 5B, the current image frame 502 is linked to neighboring keyframes 506, 508, 510 to obtain relative displacement vectors $I_{1,c}$, $I_{2,c}$, and $I_{3,c}$, respectively.

In example embodiments, the steps involved in Linking to Nearby Keyframes are as follows: (i) Tracking—the current image frame tracking position $p_t$ is first estimated by linking the current image frame to the previous image frame. The current image frame tracking position $p_t$ is estimated as $p_t = p_{t-1} + I_{t,t-1}$, where $p_{t-1}$ is the previous image frame position, $I_{t,t-1}$ is the link (displacement) vector from the previous to current image frame. (ii) Searching Nearby Keyframes—using the estimated current frame tracking position $p_t$, the keyframe database is searched to identify neighboring keyframes $\{K_0, K_1, K_2, \ldots\}$ that are within a search area. The search area is defined relative to the current image frame tracking position $p_t$. (iii) Linking: The current image frame is then linked to each of the neighboring keyframes $K_0, K_1, K_2, \ldots$ to obtain corresponding displacement vectors $\{I_{K0,c}, I_{K1,c}, I_{K2,c} \ldots\}$.

3) Current Frame Position Estimation: Each linked neighboring keyframe $K_i$ provides an independent estimate of the current image frame position $p_c^{Ki}$ at 408. Mathematically, this can be represented as $p_c^{Ki} = p_{Ki} + I_{Ki,c}$, where $p_{Ki}$ is the position of keyframe $K_i$ and $I_{Ki,c}$ is the link or displacement vector of the current image frame from keyframe $K_i$. As individual estimates of the current image frame position may not completely agree, the current frame position may be estimated as the average of all the individual estimates $p_c^{Ki}$, for $i=1, 2, 3, \ldots$.

4) Keyframe Filtering: The Vision Model Module 114 determines, at 410, if the current image frame should be added as a keyframe to the keyframe database 406. In an example embodiment, the determination as to whether the current image frame is a keyframe is based on the current image frame's distance to all neighboring keyframes. If the current image frame is too close to any nearby keyframe, i.e., if the displacement vector of current image frame with respect to any of its neighboring keyframe is less than a threshold value, the current image frame is not added as a keyframe. Otherwise, the current image frame is added as a new keyframe to the keyframe database 406. When the current image frame is added as a keyframe, its links $\{I_{K0,c}, I_{K1,c}, I_{K2,c} \ldots\}$ to existing keyframes is also stored. This information can also be used in Bundle Adjustment for post-processing adjustment of keyframe positions, as discussed under the section "Bundle Adjustment."

If the current image frame is not added as a keyframe to the keyframe database, its image content may used for focus replacement for existing keyframes. Focus replacement is explained in detail under the section "Focus Replacement."

Figure 4:
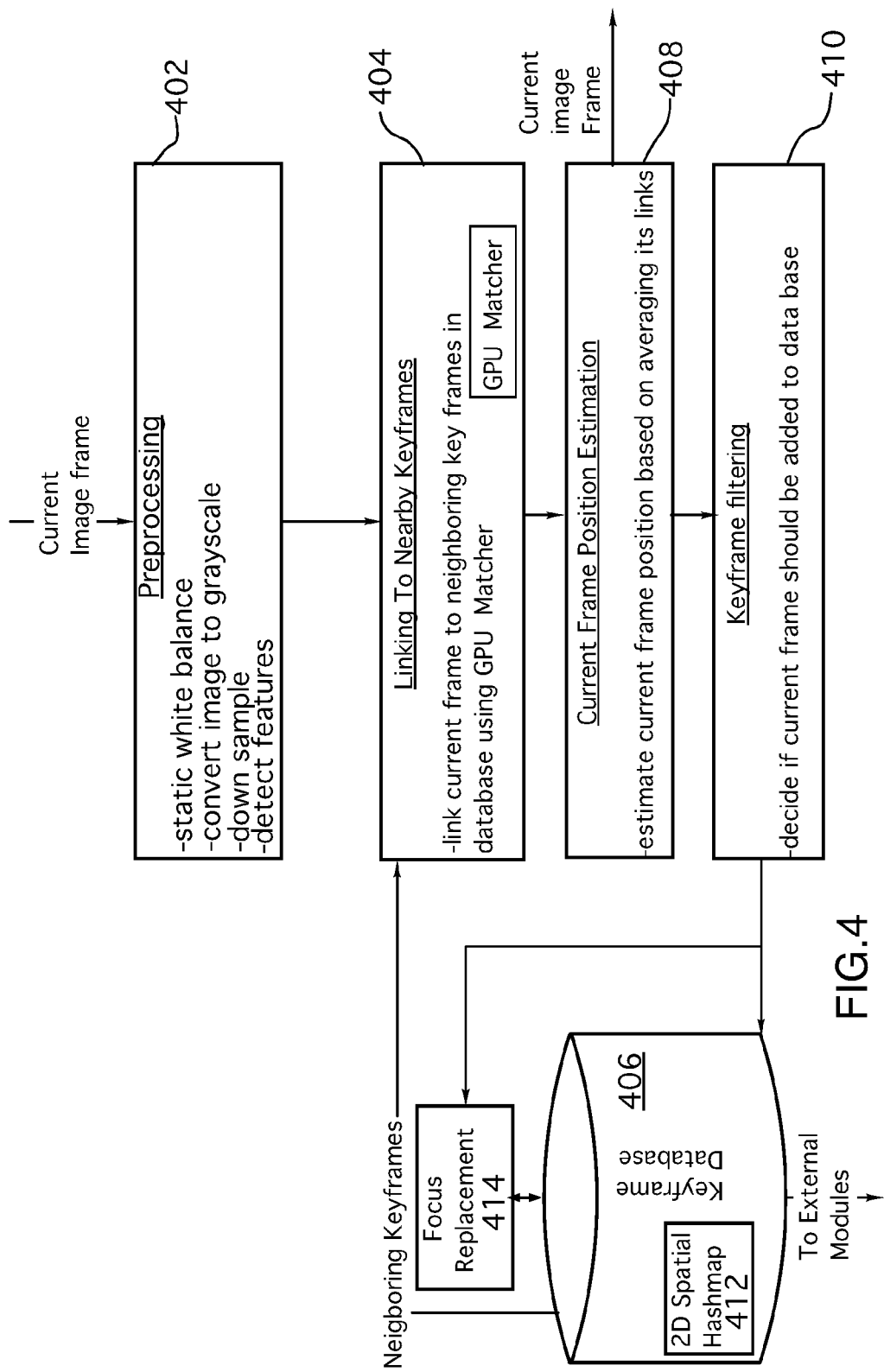
FIG. 4 is a schematic of an example arrangement of the vision model module according to certain embodiments of the present disclosure.
Figure 5A:
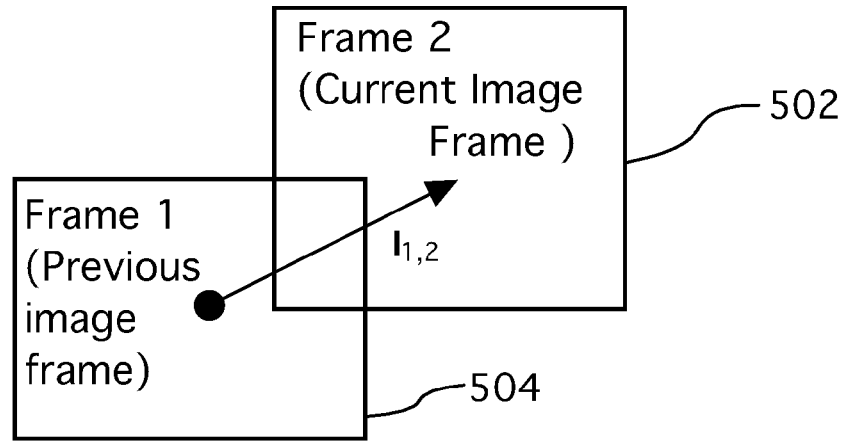
FIGS. 5A and 5B show examples of the displacement vectors $I_{1,2}$ and $I_{i,c}$ between two linked frames and between a current image frame and neighboring keyframes, respectively.
Figure 5B:
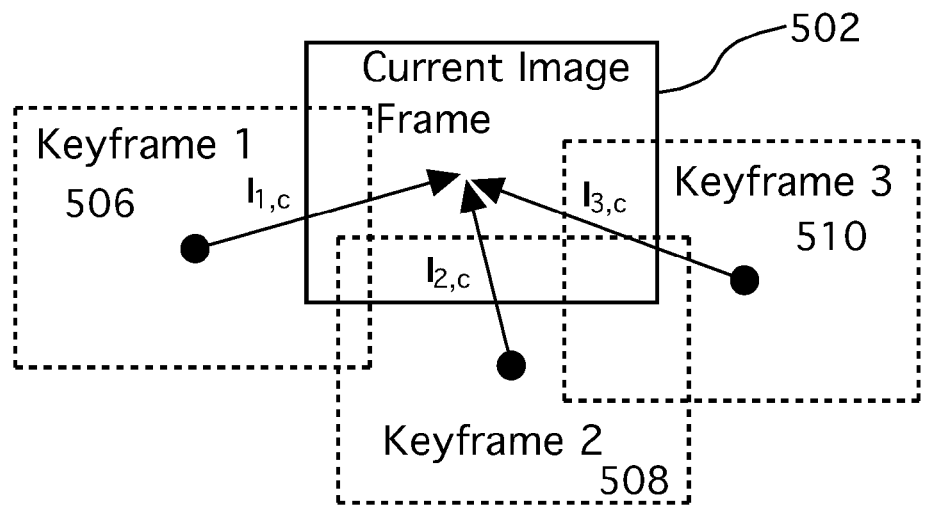

2D Spatial Hashmap module 412 and Focus replacement module 414 shown in FIG. 4 are discussed under sections "Focus Replacement" and "Image Registration" respectively.

Lost Processing

The system 100 enters a Lost state when the Vision Model Module 114 fails to link the current image frame to any of the existing keyframes. In this case, the current image frame position may be estimated from the Tracking step discussed earlier. That is, the current image frame tracking position (determined based on the previous image frame) may be set as the current image frame position (determined based on the neighboring keyframes in a normal state). If the tracking step failed as well, then the current image frame position may be set as the previous image frame position.

When the system 100 is in the Lost state, the high level steps for each new incoming camera image frame may be described as follows:

1) Preprocessing—Operation is the same as in Normal state.

2) Linking To Neighboring Keyframes—Operation is the same as in Normal state, but the search radius or search area for identifying nearby keyframe may be increased. The increase in radius/area may be dependant on the number of consecutive image frames that the system 100 is lost. If the current image frame is successfully linked, the system 100 returns to Normal state for the next image frame. Otherwise, the nearby keyframe search radius is increased for the next image frame in the Linking To Neighboring Keyframes step.

3) Current Frame Position Estimation—If the current image frame failed to link to any existing keyframes, the current image frame position is estimated as explained above. However, if linking was successful then current frame position is estimated as in the Normal state.

4) Keyframe Filtering/Focus Replacement—These steps are not performed when the system 100 is in the Lost state.

Further details of certain embodiments of the Vision Model Module are set out below.

Local Max Feature Detection

Typically, normal feature detection techniques use feature strength threshold as a method of selecting interest points or features. An issue with using a feature strength threshold is that feature strength is dependent on image contrast given the same scene. Furthermore, for certain image contents, there could be very high number of interest points that exceed the feature threshold, slowing down the image processing drastically. One way to limit the number of detected features is to have a varying threshold that attempts to keep the number of detected features constant. However, this method tends cluster the interest points in a small, high contrast region of the image frame which could reduce the robustness of the image registration process.

The Local Max Feature Detection technique enables a fairly constant number of features to be detected. It also distributes the detected feature points evenly across the image frame, facilitating robust image registration under different situations. This technique detection is also invariant to changes in image contrast.

Local Max Feature Detection technique may still first perform normal feature point detection. A low feature strength threshold may be set, obtaining a large list of potential feature points. From the list of potential feature points, a feature point is selected if and only if it has locally maximal feature strength within its N×N neighbourhood region. The parameter N controls how sparse the selected features will be. The larger the N, the more sparse features become and the less the total number of features selected.

Image Registration

Figure 6:
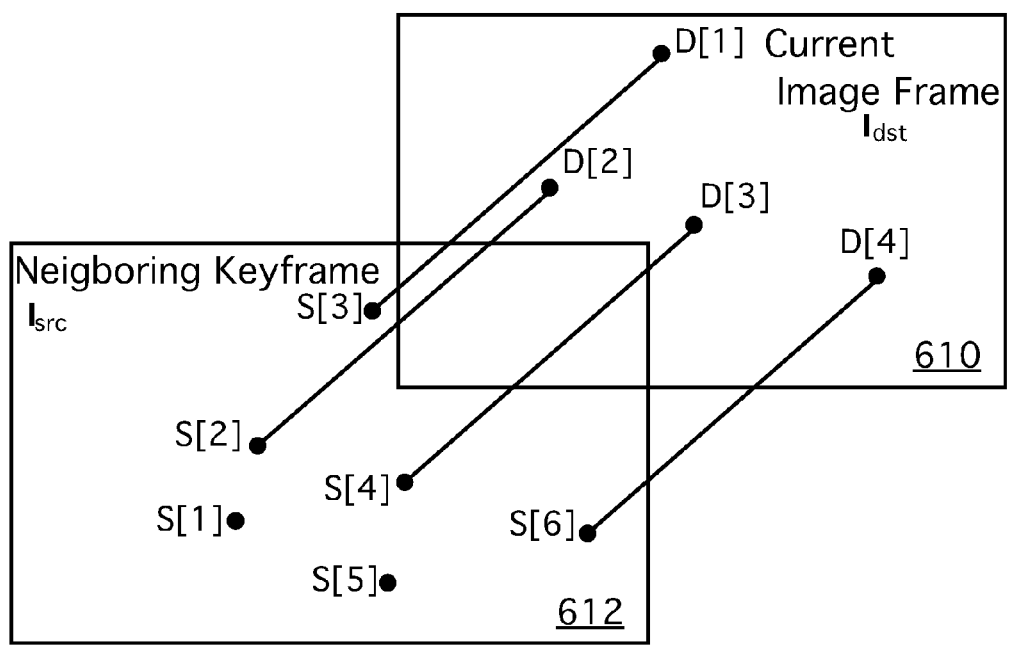
FIG. 6 illustrates identification of matching features for each feature D[i] in a current image frame ($I_{dst}$) to the corresponding features S[i] in a neighboring keyframe ($I_{src}$).

The Linking to Neighboring Keyframes uses Image Registration to link a neighboring keyframe to the current image frame. The Image Registration module finds a link/displacement $(I_x, I_y)$ from a source image $I_{src}$ to a destination image $I_{dst}$. In Linking to Neighboring Keyframes, as shown in FIG. 6, the neighboring keyframe 612 is set as the source image, and the current image frame 610 is set as the destination image.

The registration may be feature-based for real-time performance. The image registration module assumes that features for each of the two images have already been found, for example from the pre-processing step 402 discussed earlier with respect to FIG. 4. The required feature type is not specific. The Image Registration module only assumes that a feature has: 1) An image coordinate (x,y); 2) Orientation; 3) Scale and 4) A descriptor used to describe the feature. A descriptor may be a row vector of N elements that represents the feature. N may be, for example, 64 or 128. For similar features, the Euclidean distance between their descriptor vectors should be small.

The steps in the image registration are as follows:

1) Matching: Matching the set of features D detected in the destination image $I_{dst}$, to the set of features S detected in the source image $I_{src}$. For each feature D[i] in $I_{dst}$, the best match in $I_{src}$ is found. Two example methods for finding the best match are described. The method used may depend on the hardware configuration and/or processing capabilities of the system 100.

a. For fast CPU: For each D[i], a set of match candidates $S_i$ in $I_{src}$ is first filtered from S. The match candidates must have orientation and scale value that are similar to those of D[i]. Then, the descriptor of D[i] is compared to the descriptors of all features in $S_i$. The feature in $S_i$ having the minimum descriptor distance is found as the best match for D[i].

b. For fast GPU: A brute force feature match may be performed. The descriptor of D[i] is compared to the descriptors of all features in $I_{src}$. The feature in $I_{src}$ having the minimum descriptor distance is found as the best match for D[i]. The brute force matching is performed using a GPU Matcher module (see box 404 in FIG. 4) for high speed performance.

In alternate embodiment, the best match and best match distance may be recorded and stored. The 2nd best match and 2nd best match distance may also recorded for match verification purposes.

2) Match Verification: Once matching features between two image frames have been identified, a match verification step is performed. Example embodiments of the match verification process are described next.

a. Match verification by 2D Histogram. The x-axis of the histogram represents the x displacement of features. The y-axis of the histogram represents the y displacement of features. For each match pair, the feature displacement based on their respective X-coordinates and y-coordinates ($\Delta x, \Delta y$) is computed. The computed displacements are used to accumulate the 2D histogram. Correct feature matches would have consistent displacements. Outlier feature matches would have random displacements. Thus, correct feature matches should cluster into the same bin. Feature matches that are voted into the bin with the highest accumulation $b_{x,y}$ or one of the 8 neighboring bins of $b_{x,y}$ are retained. All other feature matches may be discarded.

b. Match verification by iterative geometric verification. Here, the estimated feature displacement is refined. From the retained match correspondences, the average feature displacements are found. The residuals from the average displacement are computed for each matched feature pair and only those pairs having a residual value less than a threshold residual value are retained as acceptable matched feature pairs For example, if a matched feature pair differs from the average displacement by more than twice the average residual, the matched feature pair is discarded. This geometric verification may be performed for several iterations or until no matched feature pair needs to be discarded.

Alternatively, the match verification may be done based on the descriptor distance. The best match distance for each feature in $I_{dst}$ is verified to be below a threshold. If the best match distance is too large, the match pair may discarded. Match verification may also be done based on a nearest neighbor ratio test. The best match distance is compared to the 2nd match distance. If the ratio is too close to 1 meaning that the match distances are very similar, the match pair is discarded as ambiguous.

The final average feature displacement from remaining matched feature pairs (i.e., acceptable matched feature pairs) is used as the relative displacement between the two images. As a final check, the number of remaining match pairs may be required to exceed a certain threshold. Also the average residual from the remaining match pairs may be required to be less than a set number of pixel units. If the result fails to meet the above requirements, the image registration process may be reported as unsuccessful.

As shown in FIG. 6, for each feature D[i] in $I_{dst}$, the best feature match in $I_{src}$ is found.

Focus Replacement

Figure 7:
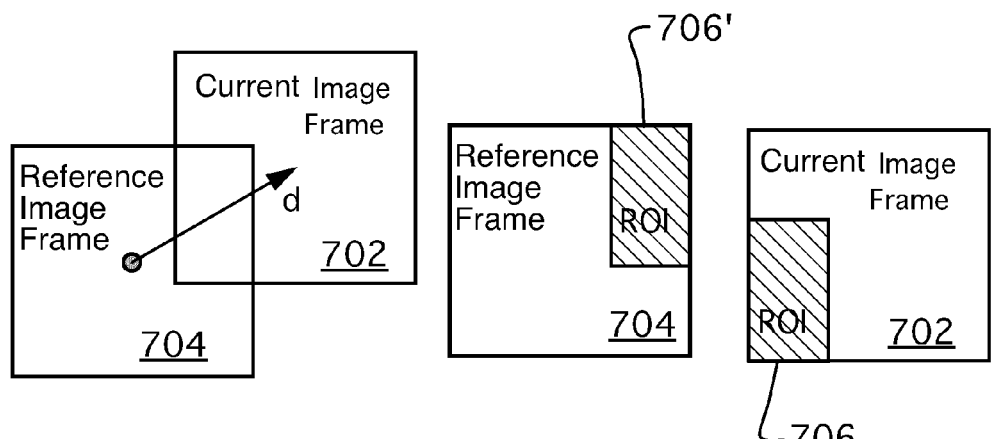
FIG. 7 shows an example of determining an area of overlap (ROI) between a current image frame and a reference image frame for use in a focus replacement method according to certain embodiments of the present disclosure.

Given an existing keyframe in the keyframe database and a current image frame that overlaps the keyframe (for example, if the relative displacement between the two is below a threshold value indicative of overlap), the Focus Replacement module will replace the keyframe image with contents from the current image if the current image is determined to be sharper. As shown in FIG. 7, the existing keyframe in the keyframe database is shown as the reference image frame 704 with respect to the current image frame 702.

According to an example embodiment, the Focus Replacement module assumes the reference image frame, the current image frame and their relative displacement between each other are known from earlier processing of the image frames. The steps of the Focus Replacement are as follows:

1) Compute the gradient images for both the reference image frame 704 and the current image frame 702.

2) Compute an overlap region in each of the two images. The overlap region is shown as shaded Region Of Interest (ROI) 706, 706' for the current image frame and the reference image frame, respectively. As shown in FIG. 7, given the displacement d between the reference image frame 704 and the current image frame 702, the area of overlap (or ROI) in each image frame can be found. In an example embodiment of the Focus Replacement method, only the overlap areas are compared for determining image sharpness.

3) Compute the gradient sum for the ROI of each image frame. The gradient sum is a parameter indicative of the image sharpness.

4) If the current image frame ROI's 706 gradient sum is greater than that of the reference image frame ROI 706', the current image frame is considered to be sharper. In this case, image replacement may be performed by overwriting the contents of the reference image frame ROI 706' with that of the current image frame ROI 706. Blending could be done optionally around the boundaries of the reference ROI for a more "gradual" replacement.

According to some embodiments, an optimized method may be used for Focus Replacement. In the situation that the current image frame ($I_c$) overlaps multiple existing database keyframes ($K_1$, $K_2$, $K_3$, . . . ), the basic method described above would be performed repeatedly, between each pairs ($I_a,K_1$), ($I_a,K_2$), ($I_a,K_3$), . . . . This could be highly time consuming as the gradient images are re-computed each time the basic method is performed. The optimization aims to remove the need to re-compute gradient images. This is done by one or more of the following:

1) Computing the gradient image for each camera frame as it streams through the Vision Model Module's preprocessing step. Thus, each frame has a pre-computed gradient image associated with it.

2) When a camera image frame (current image frame) is selected as a database keyframe, the camera image frame and its associated gradient image are stored together; thus each keyframe has a pre-computed gradient image.

3) The basic method can now be performed using the gradient images associated with the keyframe and the current image frame, without re-computing the gradients. When image replacement occurs within in a keyframe, the keyframe gradient image is also replaced in the same manner using the gradient image from the current image frame.

Keyframe Database

The keyframe database 406 may contain a large number of keyframes as the mosaic expands. One important function required by other modules is the ability to efficiently search for keyframes located within a region of interest. For example, Linking To Neighboring Keyframes needs to search for keyframes around the current image frame, and requires a search function. Having many keyframes in the keyframe database introduces search performance problems. To locate keyframes in a specific region, it can be a performance may be degraded to search through a large list of keyframes to find the keyframes of interest. Example embodiments of the present disclosure addresses this problem by creating a 2D hash map.

Figure 8:
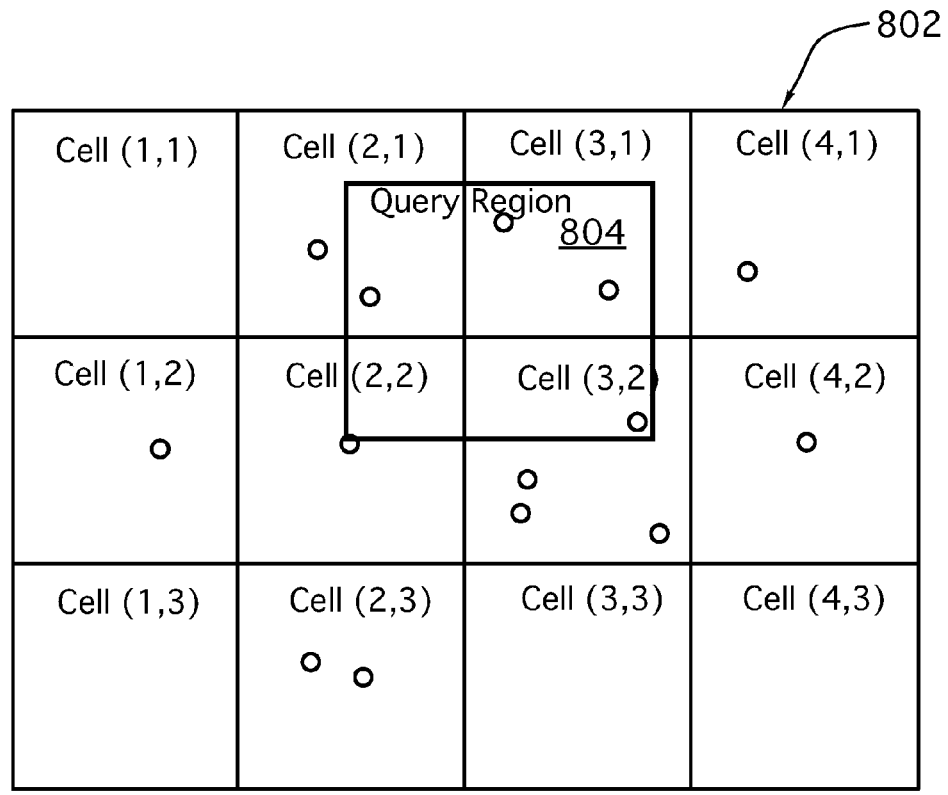
FIG. 8 shows an example of a 2D spatial hash map according to certain embodiments of the present disclosure.

A 2D hash map groups the keyframes in cells based on their position as shown in FIG. 8. The cells are aligned in a grid 802, which may be indexed by using a 2d index (i,j). When a cell is indexed, all the keyframes in that cell are obtained. Each keyframe has a hash, or a mapping from its position (x,y) to a cell index (i,j). This hash may be defined as follows:

$$i = \text{floor}(x/\text{width})$$

$$j = \text{floor}(y/\text{height})$$

where width and height are the specified width and height of each cell. For the present disclosure, it is convenient to use the image frame's width and height as these values. Consequently, all of the cells in intervals [c*width, (c+1)*width] are grouped to the same cell index c, for some integer constant c. All of these cells are considered neighbours; and cells that are at most one cell away from a given cell are indexed as c−1, c, c+1 if the distance between the positions is allowed to be width.

Inside each cell is a list of keyframes, which initially are empty lists. A new keyframe is placed in a cell based on the hash, which is used to find the index of the cell into which the new keyframe is added. When a cell is queried to find what keyframes are in it, the keyframe list identifying the keyframes within the cell is returned. When a region is queried, for example, a query region 804 encompassing multiple cells, the keyframe lists from each cell inside the query region are appended together and appended list is returned.

In order to determine the keyframes that are needed to be rendered on the display (for example, a rectangular view region), a similar lookup using the camera's min and max position for the view rectangle. Suppose the min position provides an index c_min and the max position provides an index c_max, an iterative query from c_min to c_max will yield all the visible keyframes. As shown in FIG. 8, in which each keyframe added to the keyframe database is denoted by a small circle, the query region 804 accesses keyframes of only four of the cells. Thus, processing times are reduced for faster and more efficient rendering of the mosaic representation.

Vision Model Module Extension to Multi-Objective Stitching

In certain example embodiments, it is possible to combine mosaics generated from different magnification objectives. A separate keyframe database may be maintained for each objective. If the displacements between the objective optical centers are known (say for example, from calibration), the different mosaics from each objective can be related and combined into a single mosaic.

GPU Matching Method

As noted above with respect to the Vision Model Module, any image frame captured by the microscope camera is analyzed to extract features. An overview of an example GPU Matching method 900 according to certain embodiments is described below with reference to FIG. 9.

Each of the features will be compared with the features found in the previously stitched images in order to identify any similarities. This step, called feature matching 906, estimates the position of the new keyframe inside of the mosaic. Such a process requires a number of operations as it must go through hundreds of elements per keyframe which might lead to a performance issue in a real-time system. However, it is possible to execute them in parallel using a GPU.

In certain embodiments, the present disclosure provides a solution to develop a multi-threaded version of a feature matching method exploiting the performances of graphics cards using the CUDA library.

Figure 9:
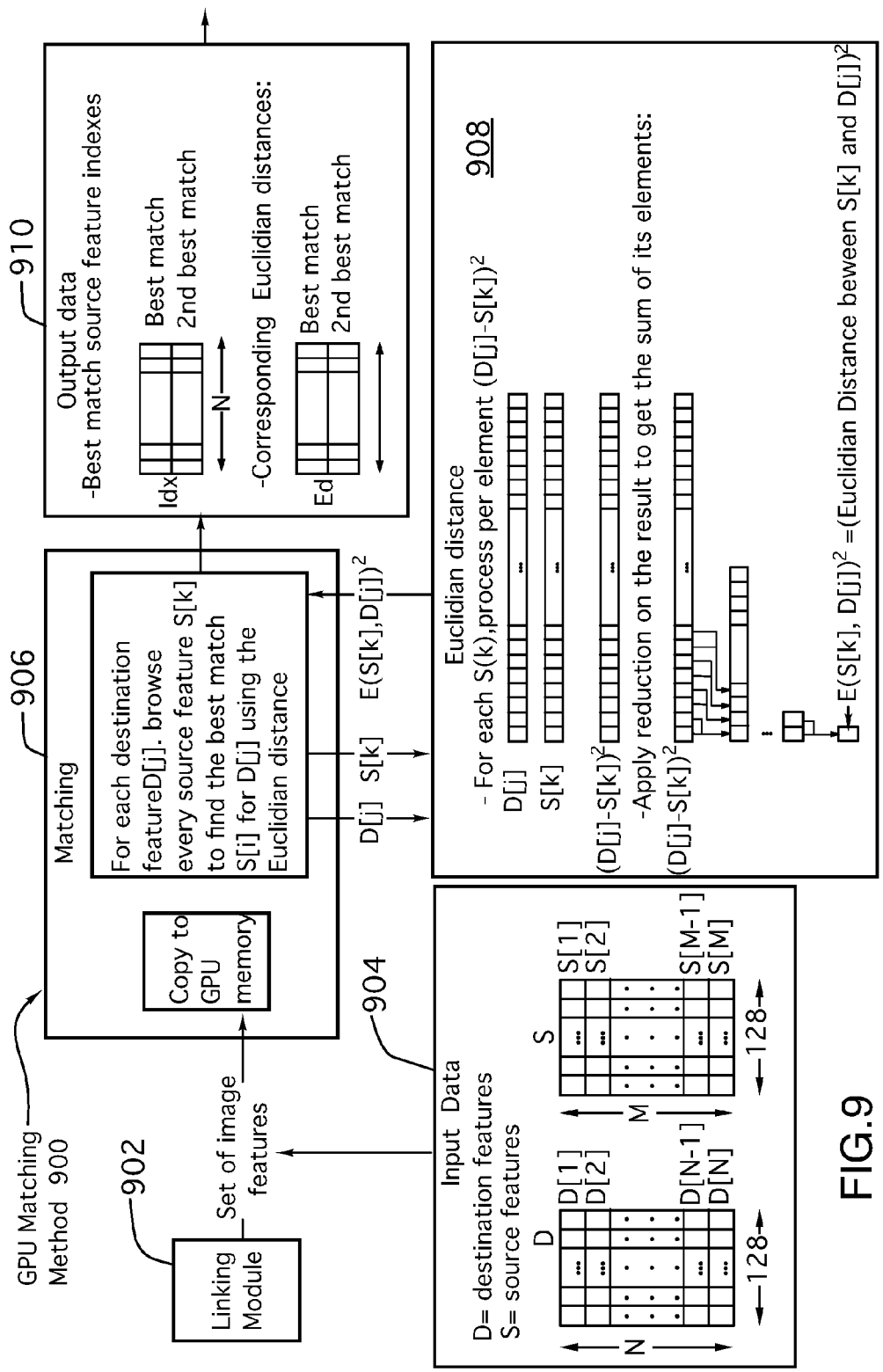
FIG. 9 shows an overview of an example GPU Matching method according to certain embodiments of the present disclosure.
Figure 10:
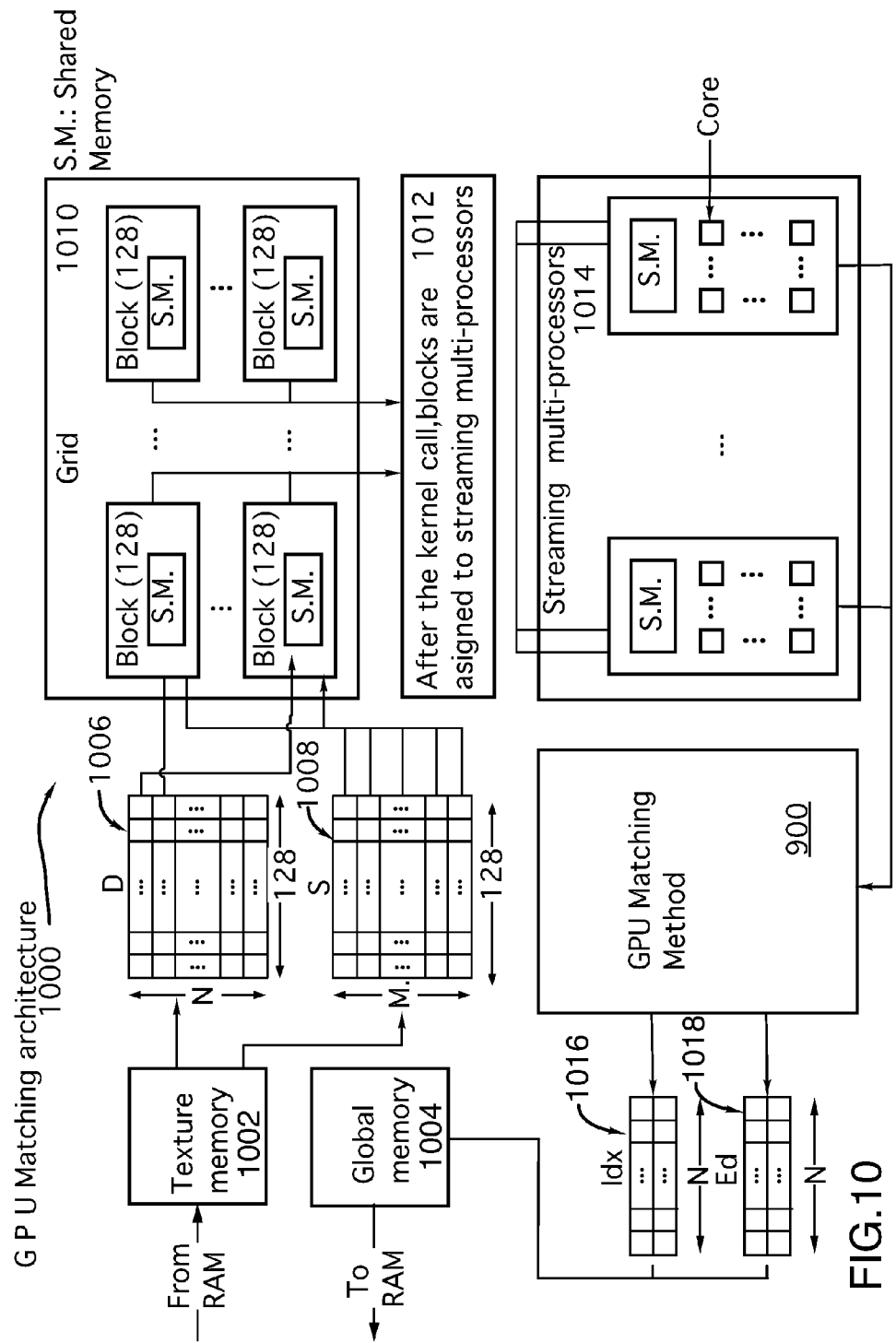
FIG. 10 shows an overview of an example GPU Matching architecture according to certain embodiments of the present disclosure.

A first part of the following discussion will describe the method itself and adapt it for multi-threading. A second part will be devoted to the development of the architecture of the program to run it on a GPU system. FIGS. 9 and 10 are schematic representation of the GPU matching method and architecture, respectively.

Feature matching 906 is typically performed on two sets of features, which are denoted as destination features (D) and source features (S) (see "Input data" 904 in FIG. 9). The goal of the method is to determine for each feature from D, which two features from S are the best and second best matches. A feature may be defined, for example, as a row vector of 128 elements describing a certain interest point.

Two features p and q are considered so that:

$p = (p_1, p_2, \ldots, p_{128})$ and $q = (q_1, q_2, \ldots, q_{128})$

The comparison between p and q is based on their Euclidian Distance E(p,q) defined as follows:

$$E(p, q) = \sqrt{\sum_{i=1}^{128} (q_i - p_i)^2}$$

The two features p and q are considered similar if the distance E(p,q) between them is close to zero. The best matches may then be found by looking for the minimum distances. Consider S as a set of M features, and D as a set of N features so that:

$$S = \begin{bmatrix} S[1] \\ S[2] \\ M \\ S[M] \end{bmatrix} \text{ and } D = \begin{bmatrix} D[1] \\ D[2] \\ M \\ D[N] \end{bmatrix}$$

where S[i] is source feature i, and D[j] is destination feature j.

The source feature S[i] of index i is considered as the best match of the destination feature D[j] if the distance E(S[i], D[j]) is the minimum distance between D[j] and any source feature:

$$S[i] = \underset{S[k]}{\operatorname{argmin}} \ E(S[k], D[j]), \ 1 \le k \le M$$

As previously noted, the method finds two best matches for each destination feature. These results are returned in a 2D array denoted as Idx of 2 rows and N columns; one column corresponding to the best matches of one destination feature, the first and second row being respectively the best and second best match source feature indexes. This method may also return the distances found between the destination features and their matching elements. The latter will be stored in an array denoted Ed of the same structure as Idx (see "Output data" 910 in FIG. 9). The Output data may be provided to the Vision Model Module (not shown in FIG. 9).

The most costly operation in this method is the processing of the Euclidian distance (see "Euclidian distance" 908 in FIG. 9). The processing may be improved by skipping the square root as distances are compared together. This processing can also be parallelized using a reduction operation. The reduction operation consists of dividing the work amongst several threads. The formula used to process the Euclidian distance is mainly formed with a sum of processed terms. It is then possible to give to each thread one term to calculate. Then, the results may be summed together. To do so, each thread may be assigned the sum of two elements. The output will then be a vector twice as small as the input arrays. The process is repeated until one unique value corresponding to the squared Euclidian distance is obtained as shown in FIG. 9 at 908.

Feature matching by the linking module 902 may be developed with two main functions. The first one function may process each source feature for each destination feature and call the second function to process the Euclidian distance using multi-threading.

GPU Matching Architecture

The architecture 1000 of an example embodiment of GPU Matching according to certain embodiments is described below with regard to FIG. 10. Several aspects must be explained to implement a GPU version of feature matching. First of all, it must be considered that the memory is managed differently in a GPU than in the CPU and several solutions are available depending on the needs. Secondly, the way the threads will be assigned to each of the graphics card's multi-core processors must be established.

A GPU system offers three kinds of memory: global memory 1004, texture memory 1002 and shared memory (S.M.). The global memory 1004 is used to store any kind of variable accessible from any thread in the system for reading and writing. The texture memory 1002 is similar to the global memory except that it only allows reading. As a result, it offers a faster memory access. The shared memory, also restricted to read only, is a stack of data shared amongst a certain number of threads. It is used inside of a block structure 1010 that is described below. Although the shared memory is faster than the texture memory 1002, its size is very limited (for example, 16 KB).

A graphics card cannot access the memory used by the CPU (RAM), the first step is then to copy the input data to the GPU memory. As discussed above, the input data is stored into two arrays: D 1006 and S 1008. The latter being only needed for reading, it is more efficient to copy them into the texture memory 1002.

The output data must also be stored in the GPU memory before transferring it to the RAM. As explained before, the output data includes two arrays of two rows and columns: Idx 1016 and Ed 1018 (see above). The latter, edited by the threads, will be stored on the global memory 1004.

The shared memory usage will be explained in more detail later as part of a block structure.

CUDA is based on the use of block structures. Each of these is compound of a set of threads to execute and a memory block shared amongst them. Blocks are arranged in a grid 1010 as shown in FIG. 10. When a kernel is called (see 1012 of FIG. 10), each of the declared blocks may be assigned to streaming multi-processors 1014 depending on the hardware capacities.

For feature matching, the analysis of one destination feature is assigned per block. Thus, the latter will be copied to the shared memory of the block so that every thread can have a fast access to it. On this architecture, every block will need to access the whole array of source features Src. Knowing that the shared memory is limited and the texture memory 1002 offers fast access to such arrays, the threads will directly read from it. As discussed above with reference to the GPU matching method, each thread of a block may be used to process a reduction operation leading to the Euclidian distance. Knowing that a feature is a vector of 128 values, 128 threads per block are needed. As a result, each block will output the two best matches of the destination feature they have been assigned to.

Renderer

Figure 11:
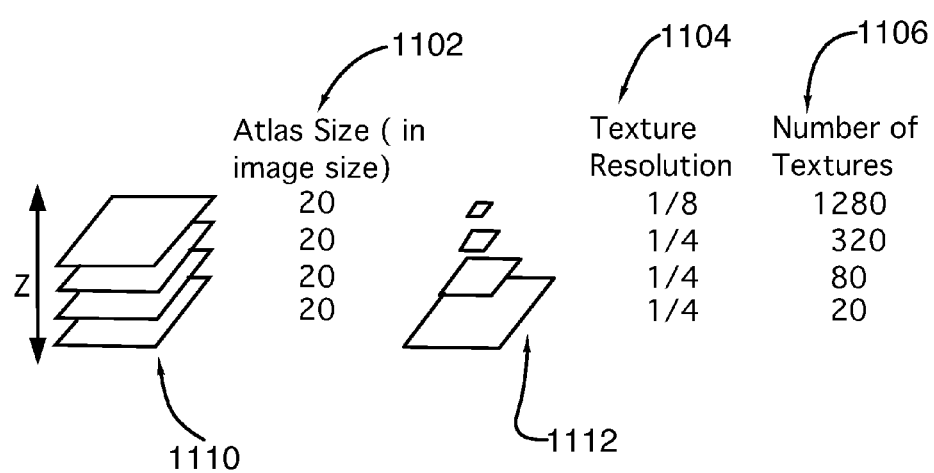
FIG. 11 illustrates the various texture atlases and their respective resolutions according to certain embodiments of the present disclosure.
Figure 12:
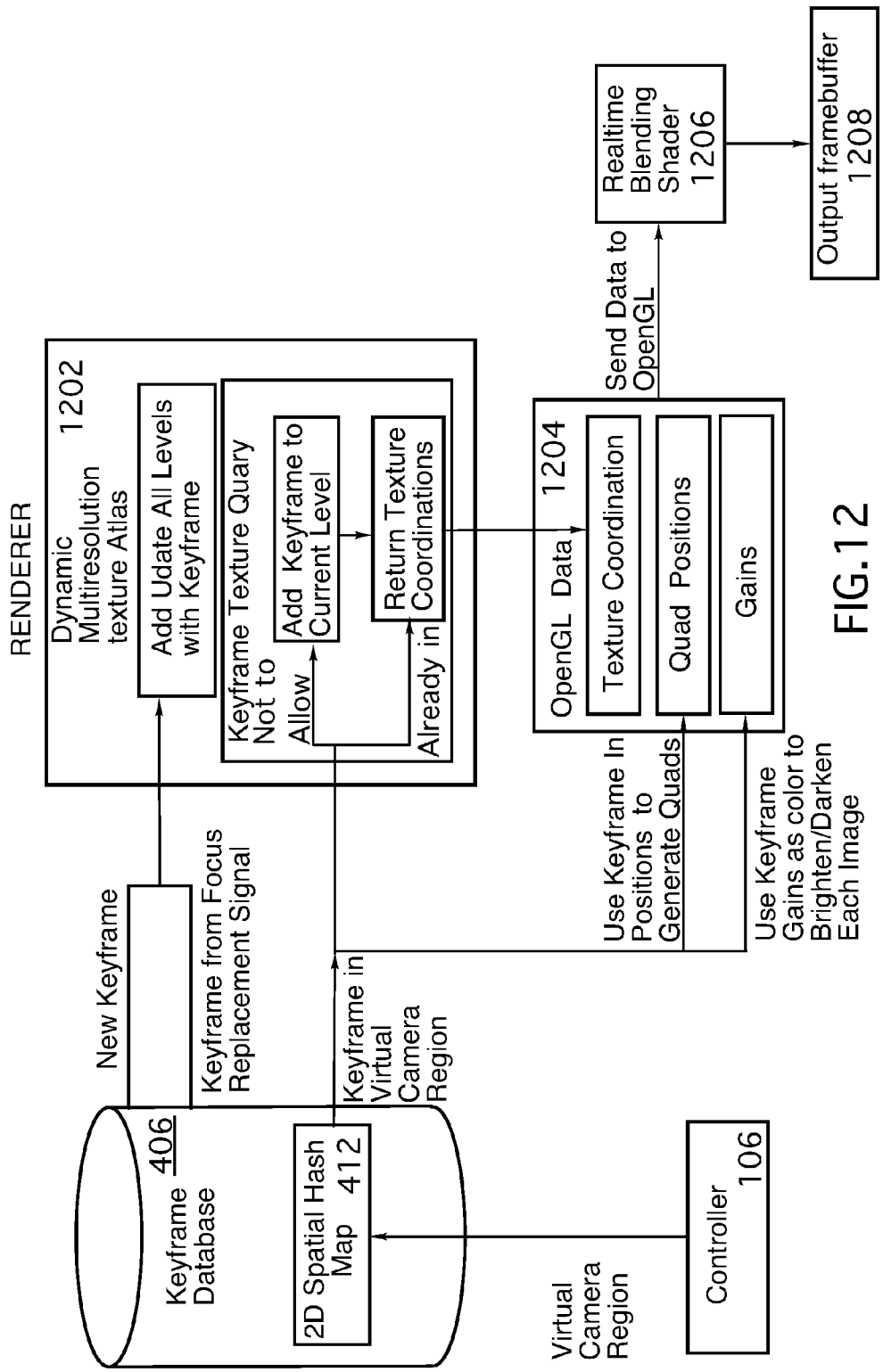
FIG. 12 is an overview of an example schematic of a renderer according to certain embodiments of the present disclosure.

The Renderer discussed above is now set out in greater detail having regard to FIGS. 11 and 12.

The task of rendering many keyframes at random positions in space could be difficult. Several ways are proposed for dealing with these problems instead of naively rendering all the keyframes all the time, updating all the textures at each rendering time. A hashmap 412 is used to perform fast lookups of what is on the screen, a specialized texture atlas 1110 is used to be able to render all of the keyframes in one batch, and a real-time blending shader 1206 is used so that the seams between frames are not as apparent.

One of the problems with trying to render all of these keyframes is the fact that it is almost impossible and inefficient to store all of their textures in memory at a given point in time. Another problem is that storing a texture for each keyframe is also inefficient as this would introduce a glBindTexture OpenGL call 1204 for each keyframe, which will hinder performance. To solve both these problems at once, a multi-resolution texture atlas 1202 is used.

A texture atlas is a large texture, storing many subtextures (or keyframe images here). Instead of calling different textures, different texture coordinates are specified for each polygon that the keyframe is being rendered to. However, fitting all the keyframe images into one large texture will result in the same memory limitation. It is noted that when fully zoomed into a mosaic of keyframes, many keyframes will not be inside the view area. On the other hand, when fully zoomed out, all keyframes may need to be rendered, but at a much lower resolution. This fact is exploited to have a set number of texture atlases, at what is referred to as different 'levels'.

As shown in FIG. 11, each texture atlas is the same resolution 1102 but at different levels 1112, the images that get stored in it are half the resolution each level. For example, if an image width and height is 2048 and the texture atlas widths and heights are all 4096. At the base level (level 0), 4 images (2048×2048) can be stored. The next texture atlas level will still be 4096×4096 but now the images going into it will be 1024×1024, so 4 times as many images as the previous level (16 at level 1) may be stored at this level. Similarly, level 2 will have 16*4 images, and level 3 will have 16*4*4 images, and so on. . . . The atlas level is dictated by the camera, and the current zoom level. If the zoom level is such that one image pixel is the same size or less than one screen pixel, then full resolution may be used. Zooming out, only half an image pixel is seen at a time and hence the next level can be used.

In order to render the keyframes, a set of texture atlases may be generated. As discussed above, each texture atlas has an associated resolution and may include at least one keyframe downsampled at the associated resolution. A display area and a display resolution for the rendering are chosen. A texture atlas having a resolution closest to the display resolution is selected (an updated, when required) from the set of texture atlases. The keyframes from the texture atlas whose associated keyframe positions are within the display area may then be rendered on the display.

When a one or more keyframes from the keyframe database are identified as having associated keyframe positions within the display area, but are not yet (or absent) in the texture atlas; the texture atlas may be updated to include these keyframes prior to rendering. For example, the missing keyframes may be downsampled at the associated resolution of the texture atlas and inserted into the texture atlas.

Note that, to render these keyframes they need to be in the atlas in the first place. A new keyframe may be put it into all the atlas levels initially, as to amortize the time of putting it in. Upon rendering, all the keyframes that need to be rendered at a given level are obtained, and if a keyframe is not in the texture atlas, the keyframe is rendered to the texture for example, using OpenGL's framebuffer object extension 1208, which is sufficiently quick.

If keyframes need focus replacement, all of the atlas levels for that keyframe must be updated. For each keyframe that is to be rendered, a check a flag on that keyframe set by the Vision Model Module may be examined to determine if it needs updating in the texture atlas and the keyframe may be uploaded to the texture atlas at all levels as described earlier.

Once the textures are packed in a texture atlas for easy lookups, the texture coordinates are obtained from the texture atlas when rendering quads/image rectangles. The process is started by querying the Vision Model Module for current keyframes overlapping the rendering camera to obtain a set of IDs. With these IDs, the keyframes are checked to determine if they are in the texture atlas at the given zoom level. If they are not, the keyframes are added in. If they are already in, nothing is to be done. For both cases, the texture coordinates are obtained to indicate where the keyframes are in the texture atlas (the location of where the keyframe is in the texture atlas). With the texture coordinates for each quad, the positions of each quad is generated. The top left position of the quads is already known from the keyframe structure and the 3 other vertices are generated through adding the frame width/height to the top left position. The positions and texture coordinates are passed to OpenGL 1204 in a batch (a big array) to save on thousands of OpenGL calls.

The keyframes, when rendered, have sharp edges where one frame ends and another begins. To solve this, a linear combination of both frames may be rendered, in other words, the keyframes may be blended. In a region of a frame where there are no frames overlapping, the contribution should solely be from that frame. If there is an overlapping region, the keyframes are weighted based on how close they are to the edge.

To do this, a Gaussian image centered at the middle having the same size as a keyframe may be pre-computed. When multiple frames overlap, they may be blended together by use of a 2 pass pixel shader. On the first pass, all the frames have additive blending from OpenGL enabled, essentially all the frames get added together, and may be weighted as follows in the first pixel shader as a weighted average:

pass1colour.rgb+=gauss*framecolour.rgb
pass1colour.a+=gauss

In the second pixel shader, all the frames have been added together, and may be normalized based on the addition of the contribution weight:

pixelcolour=pass1colour.rgb/pass1colour.a

Thus, each pixel is a weighted average depending on where the originating pixel was in the keyframe (middle of the frame gets the most weight and edges get the least).

The real-time rendered scene may be saved to the hard drive by moving the virtual camera around the scene (as a user would move it with the mouse) at fixed grid locations to generate each tile. The viewing area may also be increased (zooming out on the virtual camera) to generate a tiled .tiff file. Since rendering is a real time operation, the cost of this save function is limited by the time to save to the hard drive as opposed to preprocessing each tile first.

Controller

Figure 13:
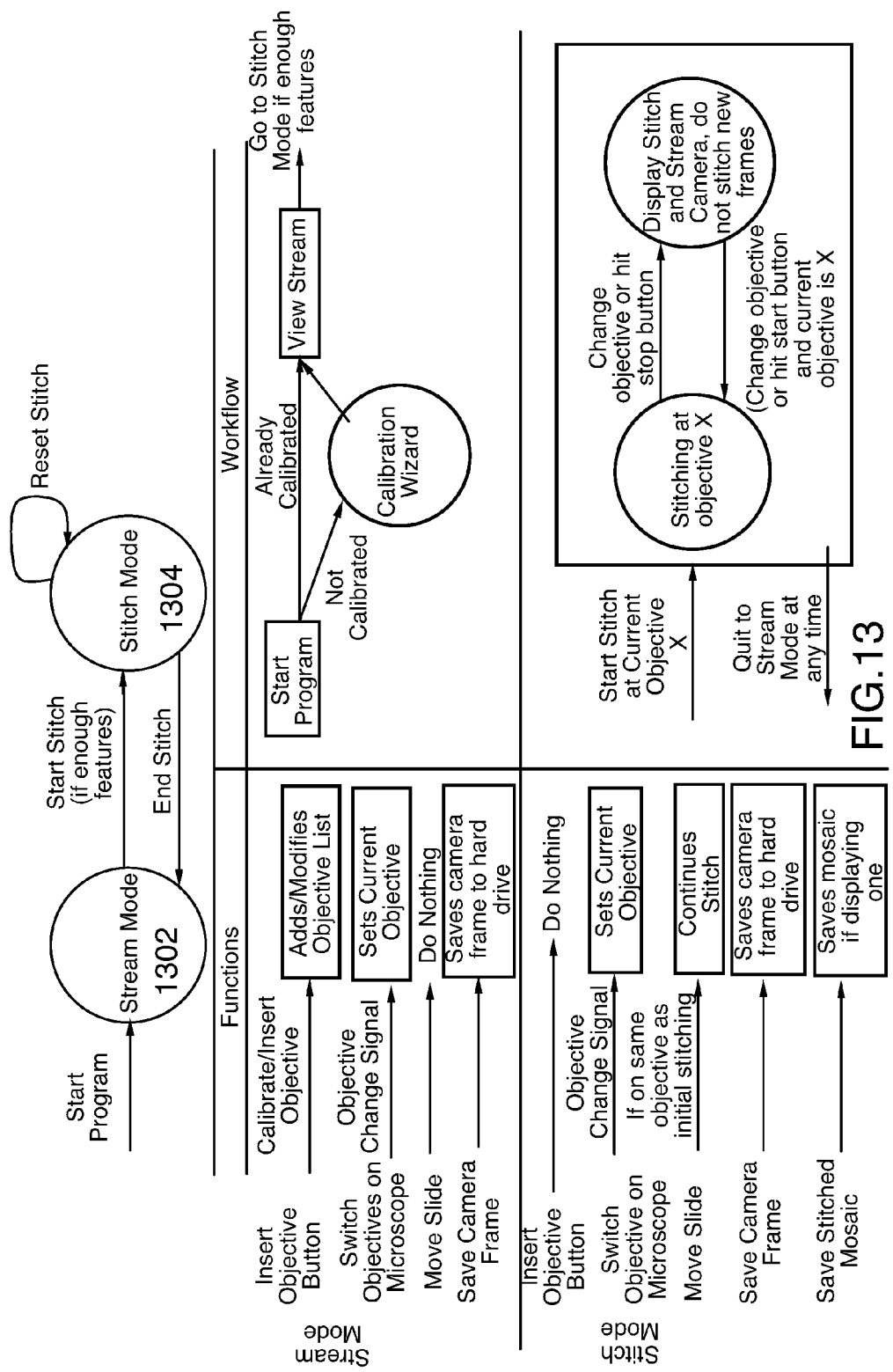
FIG. 13 is an overview of an example state diagram of a controller according to certain embodiments of the present disclosure.

The controller of the present disclosure is now discussed having regard to FIG. 13.

The controller 106 defines how the user interacts with the rest of the system 100. Usually, the commands are a simple redirection of commands to things like the camera 104, Vision Model Module 114, Renderer 108, but it also keeps track of virtual information.

Figure 14:
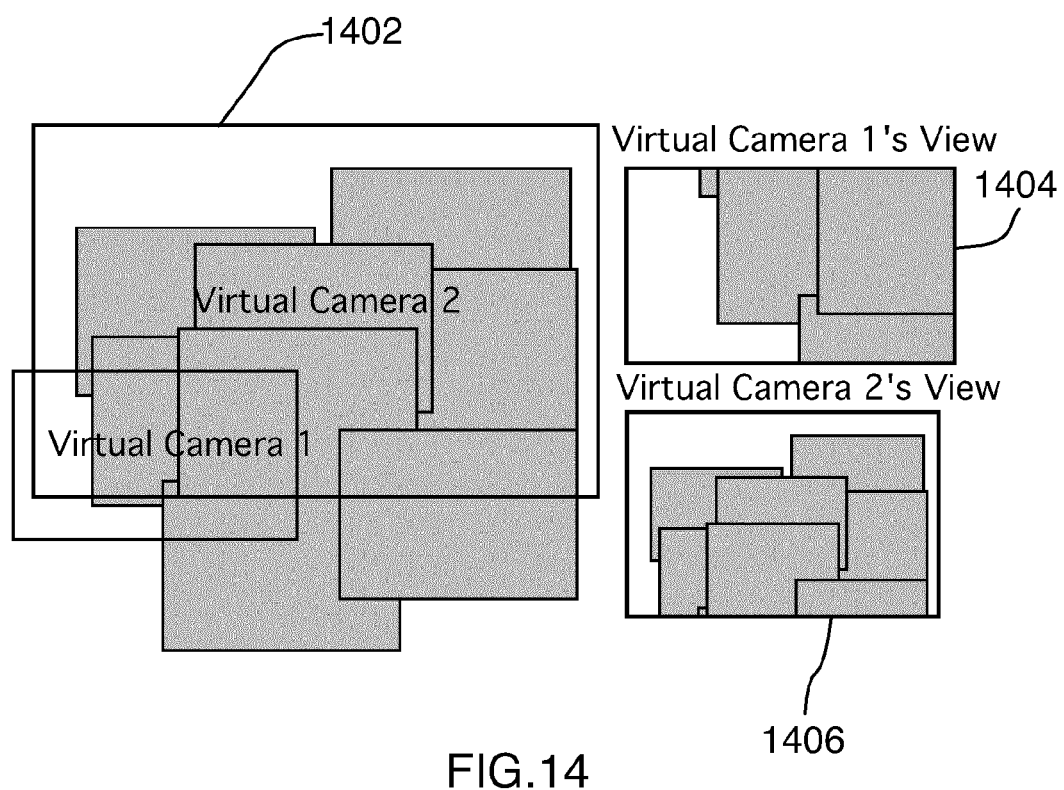
FIG. 14 shows an example of a virtual camera within the controller according to certain embodiments of the present disclosure.

As shown in FIG. 14, it houses the virtual camera, or a camera that provides information as to where to view the keyframes. For instance, the virtual camera can be looking at only one keyframe, filling the screen with it or it could be displaying a more zoomed out mosaic showing all of it. The virtual camera defines how navigation through the virtual representation 1402 of the scanned image is performed. For example, it can be configured as a rectangular region, and that region gets mapped to the screen via the rendering pipeline. In the example shown in FIG. 14, there are two virtual cameras, one showing a more zoomed in view 1404 and one showing a more zoomed out view 1406.

An arrow (UI Arrow) may be displayed when the user gets lost (i.e. the current keyframe cannot be matched with the existing mosaic). The direction of the arrow may be from the current keyframe to the average of nearby neighbours. This will yield an approximate 'good' direction for the user to try to go back to the mosaic region. Having this kind of feedback at all is beneficial, to let the user know they are getting lost because they are at a region with not enough features, or are moving too quickly.

Certain embodiments of the present disclosure include a stream mode 1302. The goal of streaming mode 1302 is to calibrate the microscope objectives as well as look at a live stream of the camera to make sure it is OK for stitching. There are options to save a snapshot of the camera, calibrate current objective, insert a new objective, remove the current objective. Once the setup is properly calibrated, the system is ready to be used properly. The user can select 'begin stitch' if there are enough features present in the current camera image frame. If there are not enough features, the user is not allowed to stitch as the method does not have enough content to work with.

Further embodiments have a stitch mode 1304. Once in stitch mode, the user is free to stitch an image by moving around with the microscope stage. If the user wishes to navigate with the mouse they can do that as well. There is also a live view option to let the user see the current camera stream at the same time to help with focusing. If the user switches to a different objective, the system automatically stops trying to stitch and keeps showing the current camera view. For both stitch and streaming mode, the objectives are switched and calibrated automatically. If the user switches back to the objective they were stitching at, then the stitching attempts to resume. At any time the user can save the stitched image, activate gain compensation, go back to stream mode, or save the current camera frame.

Fast Save

In addition to the foregoing, embodiments of the present disclosure can be equipped with miscellaneous functions and modules. One such module can be a "Fast Save" feature 116. To save the mosaic, it must be first generated from all the individual keyframes. A key step in generating the mosaic is blending, to handle keyframe overlaps. The Fast Save uses the Renderer's built-in quick blending to generate the entire mosaic. Once the mosaic is generated, it is saved in Big-TIFF format as described earlier under the section "Render."

Quality Save

Figure 15:
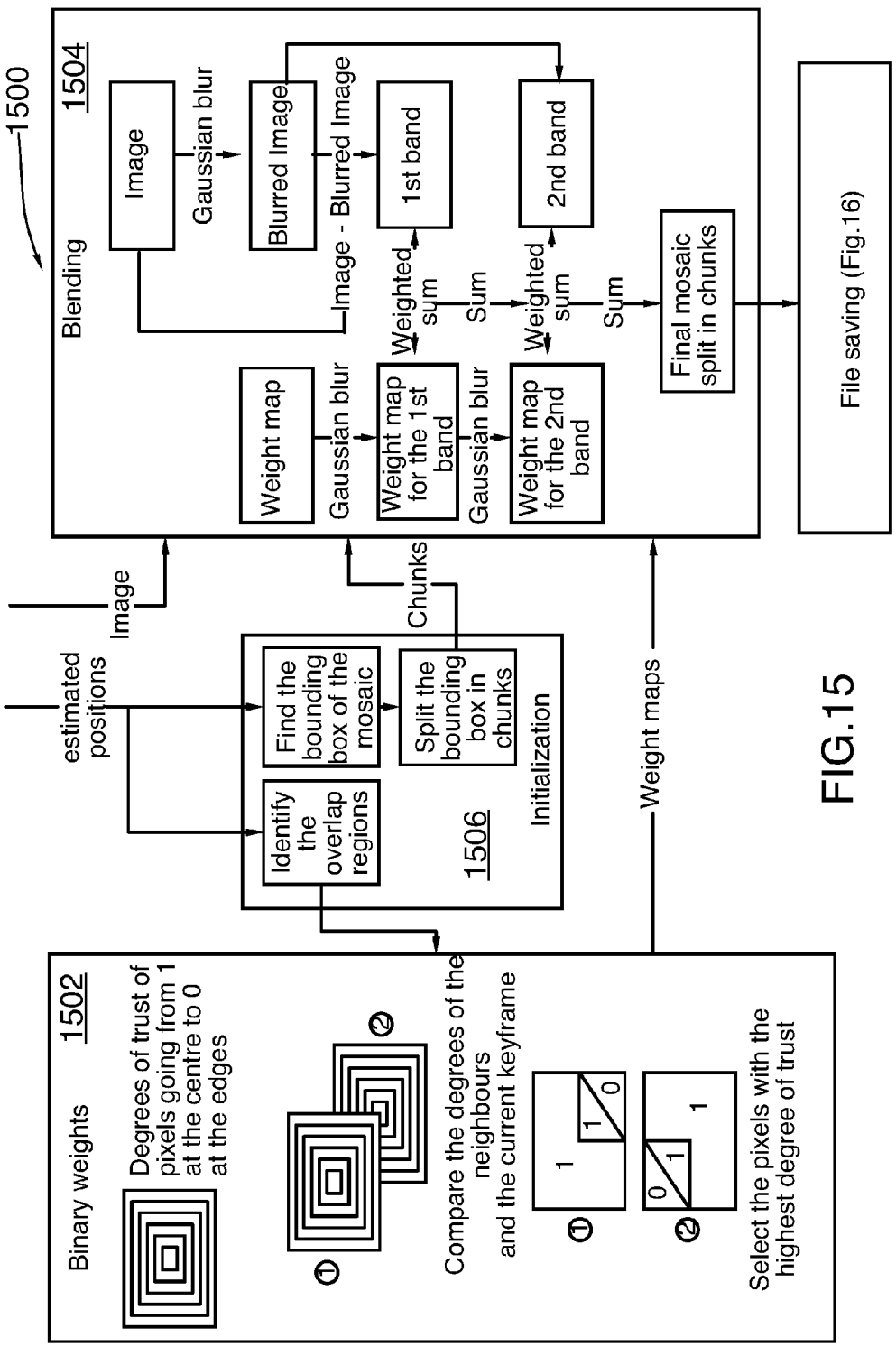
FIG. 15 is an example arrangement of the multi-band blending functionality for saving files according to certain embodiments of the present disclosure.

Embodiments of the present disclosure may also contain a Quality Save, or "Multi-band Blending" feature 118, which is discussed below with reference to FIGS. 15 and 16. This is a higher quality version of the mosaic saving compared to Fast Save feature 116. Quality Save generates the mosaic using Multiband Blending, which is a more sophisticated blending method compared to the simple one used by the Renderer 108. An example arrangement of the Quality Save functionality is discussed below with reference to FIGS. 15 and 16.

As described in the Vision Model Module, building an image mosaic consists on stitching a set of images captured by a digital camera. Theoretically, each image is sampled under the same conditions. However, in reality, certain unexpected effects can compromise these ideal parameters. As a result, lighting fluctuation, scene motion or exposure difference may be noticed leading to discontinuities in the mosaic such as registration errors, heterogeneous brightness or visible edges. It is then necessary to apply post-processing techniques before saving the mosaic.

A first solution would be to apply gain compensation. Although gain compensation has proven its efficiency on alleviating brightness differences, it does not fully remove the visible image boundaries and has no effect on registration errors. A robust process to blend images together is desirable.

The simple approach is to use linear blending. It consists on applying a weighted sum to each image of the mosaic in order to have a smooth transition between them. This method is efficient to remove the visible edges and is relatively fast. However, it tends to leave some registrations errors and might alter the contours in the images affecting the quality of the final result. An alternative is the Multi-Band Blending method described in P. Burt and E. Adelson, A Multiresolution Spline With Application to Image Mosaics, 1993, the disclosure of which is hereby incorporated by reference. Further, a different implementation for image stitching was developed and is set out in M. Brown and D. Lowe, Automatic Panoramic Image Stitching using Invariant Features, 2007, the disclosure of which is also incorporated herein by reference. The latter is based on the idea to decompose each sample in bands depending on the detail frequencies. Thus, it becomes possible to blend the generated bands over a varying spatial range. By choosing a lower range for the highest frequencies, the contours are preserved assuring a better quality. Also, a higher range is applied to low frequencies removing the strong discontinuities without altering the image details.

The following describes the Multi-Band Blending method 1500 and offers an optimized implementation of it adapted to the embodiments of the present disclosure.

The Multi-Band Blending method will be explained through several steps. First of all, it is necessary to define a weight function which will help to determine the smooth transition between the images. Then, a process will be put in place to decompose each image in several bands. The final step will be to blend each band and merge them together to get the final mosaic.

Generally, image blending is based on a weighted sum. The idea is to set for each pixel a value between 0 and 1, setting the influence of the pixels in the final result; 1 being for the pixels we fully use while 0 is for the ones excluded from the mosaic. The pixels of intermediate values are then used to get a smooth transition between images. In the case of Multi-Band Blending, the size of the transition area will vary for each band to preserve details.

Before setting the blending range, an appropriate border between the images is to be chosen. To do so, an intermediate weight function $D(x,y)$ setting a degree of trust for each pixel of each image is set. It is assumed that the centre of an image contains more trustable information than its boundaries. The function $D(x,y)$ will then set values varying from 1 at the centre to 0 at the edges. A binary weight map 1502 is built by choosing the pixels with the highest degree:

$$W'(x,y) = \begin{cases} 1 & \text{if } i = \underset{j}{\text{argmax}}\ (D^j(x,y)) \\ 0 & \text{otherwise} \end{cases}$$

with j an integer so that $0 \leq j < n$, and n the number of images to blend.

Finally, the transition area is processed by blurring the resulting weight map, the intensity of the blur setting the blending range.

Multi-Band Blending requires isolating the details from the background. This operation can be processed by decomposing the image depending on the spatial frequency. The latter is a measure similar to temporal frequency in the spatial domain. In the case of visual perception, the high spatial frequencies represent abrupt spatial changes such as edges while low spatial frequencies represent more global information like the background. Multi-band blending originally works on any number of bands. However, after some testing, it was noticed that the results were not noticeably improved as the number of bands was increased. Thus, the example embodiments are described herein using two bands.

A common way to decompose spatial frequencies is to apply a Gaussian filter and will be described with reference to the blending 1504 shown in FIG. 15. The Gaussian filter being a low-pass filter, has the effect to blur the image by removing the high frequencies. Consider a Gaussian blurring kernel $g_\sigma(x,y)$ of standard deviation $\sigma$. This function can be applied to the $i^{th}$ image $I^i(x,y)$ of the mosaic by convolution:

$$I_\sigma^i(x,y) = I^i(x,y) * g_\sigma(x,y)$$

the resulting image $I_\sigma^i(x,y)$ representing the spatial frequencies of the original image in the wavelengths $\lambda \geq \sigma$.

The high frequencies are retrieved by subtracting the result from the original image:

$$B_1^i(x,y) = I^i(x,y) - I_\sigma^i(x,y)$$

$$B_2^i(x,y) = I_\sigma^i(x,y)$$

$B_1^i(x,y)$ and $B_2^i(x,y)$ being respectively the $1^{st}$ and $2^{nd}$ band of the $i^{th}$ image $I^i(x,y)$ in the mosaic.

The decomposition being done on each image, their bands must be blended together. As explained before, the advantage of multi-band blending is to offer the possibility to blend over a different transition area depending on the range of wavelengths. To do so, the weight maps will be blurred by applying a different standard deviation $\sigma_k$ depending on the $k^{th}$ band to blend:

$$W_k^i(x,y) = W^i(x,y) * g_{\sigma_k}(x,y)$$

$W_k^i(x,y)$ being the weight map applied to the $k^{th}$ band of the image $I^i(x,y)$.

The next step is to blend the image samples by processing a weighted sum for each band:

$$I_k(x, y) = \frac{\sum_{i=0}^{n} B_{k\sigma}^i(x, y) \times W_{k\sigma}^i(x, y)}{\sum_{i=0}^{n} W_{k\sigma}^i(x, y)}$$

where $I_k(x,y)$ represents the $k^{th}$ band of the final mosaic.

The two resulting blended bands can then be summed together to get the final result.

This method requires heavy processing; and may not satisfy the needs of a fast post-processing method. The following section describes a set of processes allowing for a stronger and faster program using recent developments such as GPU programming.

First, the focus is on in reducing the memory usage by splitting the mosaic in chunks (see 1506 in FIG. 15) and then by optimising the storage of the weight maps. A solution for saving the post-processed mosaic in a file is then implemented. Finally, a solution of optimisation using GPU programming is described.

Memory usage has been an important issue for this method. A noticed problem came from the operating system Windows™. In fact, the program appears to crash when trying to allocate memory bigger than 4 GB. This situation appears to be common while trying to stitch a big set of image samples. The solution found to this issue has been to divide the mosaic in small chunks, ensuring that they will not pass 4 GB of memory. To blend the images per chunk, it is necessary to identify which images intersect with them. Then, each chunk may be treated as a separate mosaic (see 1602 and 1604 in FIG. 16). To reduce the number of pixels to process, it might be tempting to crop the image samples to what is actually used inside of a chunk. While cropping might be a good optimisation during the processing of the weighted sum, this might cause troubles while building the weight maps. If the weight maps are cropped before blurring, some situations may lead to incoherency. For instance, if an overlap region is cropped in the process, the low-pass filter will take in consideration the boundaries of the chunk. Thus, the transition area will not fit with what would be done without chunks which might lead to insert visible edges inside of the final mosaic.

Another aspect to take in consideration is the weight calculations. Two solutions appear to be possible for this. The first one involves processing the weight maps when needed. If the chunks are small enough, the latter should not involve a lot of images. However, this process would be repeated on each keyframe in each chunk. Also, theoretically, a sample can appear in several chunks. As a result, this process might be repeated more than needed leading to slowing down the execution of the program. The other solution would be to pre-process the weight maps and store them for latter use. This method allows ensuring that the weight map of an image is only processed once. However, it also leads to considerably increase the memory usage as the number of keyframes rises. The first solution appears to be the more appropriate. It is known tests that the memory usage is a real problem that might lead to crash or considerably slow down the system. Also, if the weight maps can be processed only considering the keyframes in a chunk, this can reduce the number of cases to treat. Thus, this solution seems to be a cost-effective method.

As described before, it is necessary for the method to save the blended mosaic. This method aims at working on large data sets and uses a specific file format called Big TIFF. However, other files formats may also be used. The Big TIFF format has the advantage to split the whole image in tiles, offering a faster way to display and browse the files. Also, it allows the use of levels of details which is a strong feature to quickly zoom in and out on large images. While functions have already been developed to save such files, it requires the tiles for the different levels of details to be furnished. Thus, after blending the final mosaic, the program should browse it once per level to extract the tiles and resize them to the appropriate size for levels of lower details.

Figure 16:
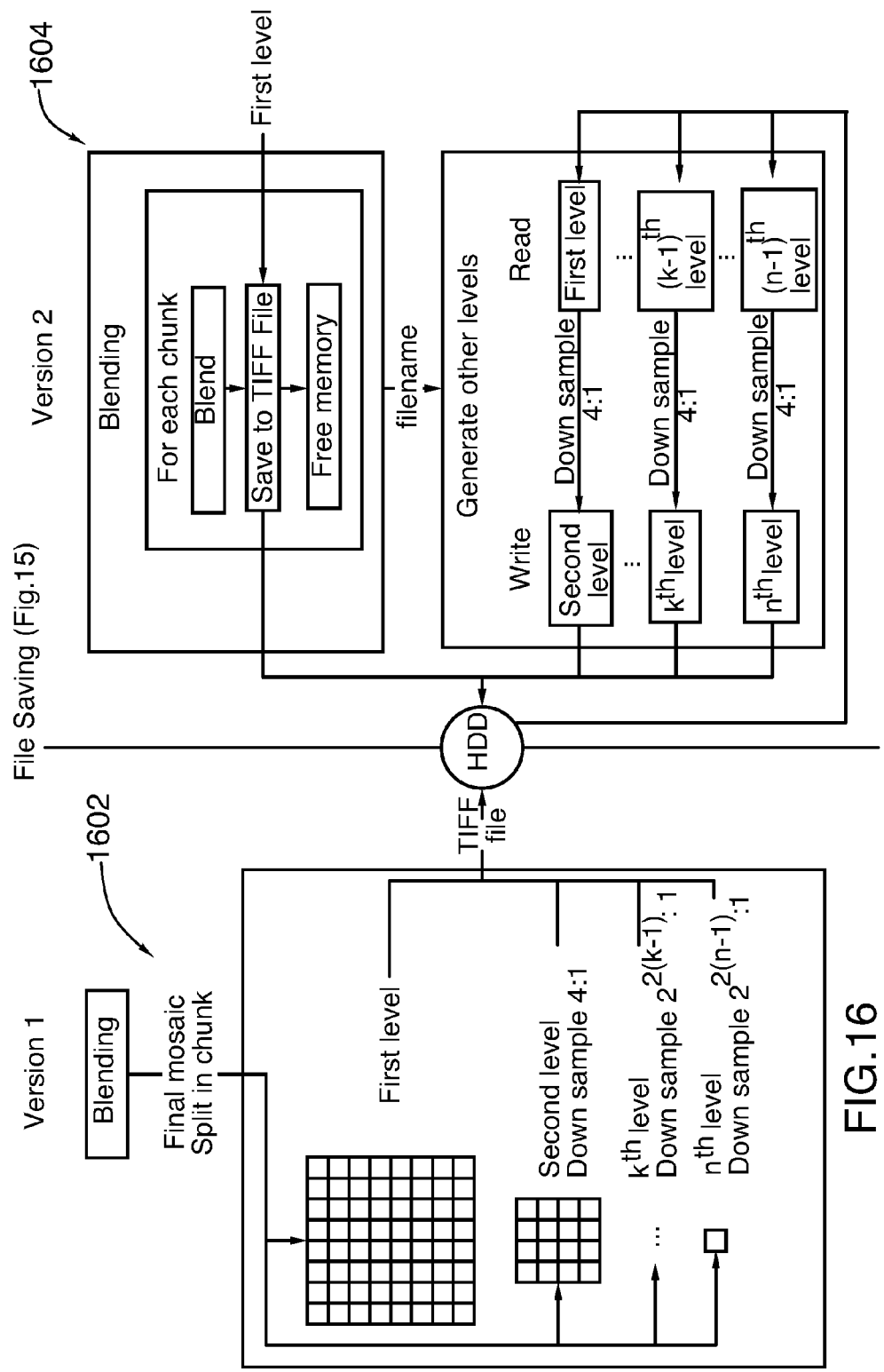
FIG. 16 is a flowchart diagram illustrating an example file saving functionality according to certain embodiments of the present disclosure.

A first approach would be to save the data at the end of Multi-Band Blending (see 1602 in FIG. 16). However, this method forces the program to keep in memory every chunk until the end of the process. While this situation isn't a critical problem, it might worthwhile to avoid extra memory usage by only keeping one chunk in the RAM. To do so, the chunks may be considered as tiles and saved on the fly (see 1604 in FIG. 16). When the blending method is finished, the first level of details is already generated and saved on a file; only the other levels of details need to be then built. An issue with this approach is that the mosaic is not in the memory anymore and the data already saved must be extracted. This may cause a problem as the saving functions are not built to handle reading and saving at the same time. Two streams on the file are then required: one for saving and one to read the previous level. The operation needed is then to extract four tiles from the previous level to generate one tile in the next one.

The process diagram shown in FIG. 16 summarizes the two approaches explained above.

The preceding passages described optimization of memory use. However, these modifications may not make the process execute faster and might even have slowed it down in certain points. To reduce the execution time, GPU processing is used to exploit the hardware performances. In fact, it is known that GPU processors can be a lot more efficient than CPU in certain situations. GPU processors are very efficient when managing a large number of threads. Hence, GPU processors may be used for highly parallelizable operations such as computations on matrices. The different steps of Multi-Band Blending have been reviewed to identify the remaining bottlenecks and find a way to implement them on the GPU. The Gaussian blur was identified as a significant bottleneck. This operation involves heavy processing and is repeated several times for each keyframe. NVIDIA uses the CUDA library to have a real-time filter. This implementation was modified to adapt it to the embodiments of the present disclosure.

An important thing to consider in GPU programming is the memory usage. In fact, the CPU and GPU have both there own memory storage. Thus, it is necessary to transfer the data from the RAM to the GPU memory which could slow down the program if repeated too much. Thus, it has been decided to use GPU programming for the operations between the filters as well. This way, data transfers are only done twice per keyframe. To do so, a new class GpuMat has been developed in order to easily manipulate matrices on GPU.

Gain Compensation

Certain embodiments may also employ Gain Compensation 122, which is a module that reads all keyframes from the keyframe database and attempts to adjust individual keyframe image gains so that the keyframes appear uniformly bright.

In some microscopes, fluctuations in intensity between consecutive frames is apparent due to the light source sampling. This is mitigated by trying to make the intensities of each overlapping frame consistent. This approach is called 'gain compensation', or finding values to multiply each frame by so the resulting mosaic will not have sharp differences between overlapping frames.

This is solved as a linear system as described in *Automatic panoramic image stitching using invariant features*, Brown, M. and Lowe, D. G., International Journal of Computer Vision, Volume 74, Number 1, pp. 59-73, 2007, Springer, the disclosure of which is hereby incorporated by reference.

A gain matrix g_i is determined that will be applied to a frame i as a constant multiplying the whole image. There are two sets of terms in the gain compensation solving matrix. The first set has a row in the matrix for when a frame overlaps with another. Suppose the two frames (i and j) have average intensities in the overlapping region (I_i, I_j) then the row in the matrix looks like:

$$\text{sigma}\_1*(g\_i*I\_i - g\_j*I\_j)^2 = 0$$

Where sigma_1 is the weighting factor for this set of equations. Essentially, once the gains have been applied then the overlapping images should have the same intensity. Every overlapping set of images i and j has one row in the matrix.

A trivial solution to this sets all the gains g_i to zero. To overcome this, a new term for each image is introduced, saying the gain should be near 1 (unity equation) as follows:

$$\text{sigma}\_2*(g\_i-1)^2 = 0$$

Where sigma_2 is the weighting factor for the unity set of equations. We solve these two sets of equations in a least squares sense.

Bundle Adjustment

In addition, there may also be a Bundle Adjustment module 120, which reads all keyframes from the keyframe database, plus the keyframe links to each other. It adjusts the keyframe positions such that all link constraints are satisfied.

Over time, the keyframe position estimates may have inconsistencies due to the build up of tracking error. One such scenario is when the mosaic is built as a large circular loop. When the user returns to the starting point of the loop, the estimated current position from the latest keyframe may be inconsistent with the estimate from registration to the initial reference keyframe.

Figure 17:
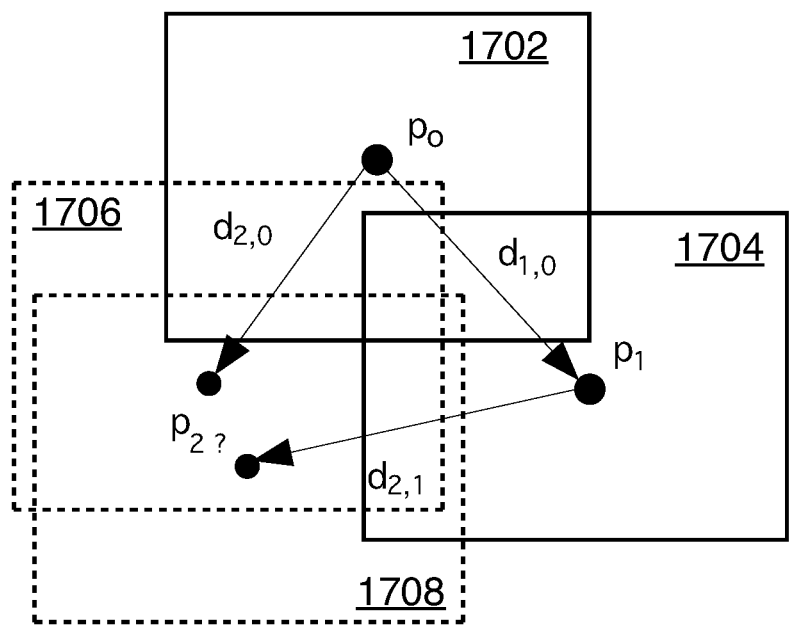
FIG. 17 is an example of using bundle adjustment functionality to resolve keyframe positions according to certain embodiments of the present disclosure.

FIG. 17 shows the case that there is discrepancy between estimates of $p_2$, from $d_{2,0}$ (from keyframe 1702) and from $(d_{1,0}+d_{2,1})$ (from keyframe 1704) resulting in possible keyframe positions depicted as 1704 and 1708. Usually there's tracking error accumulated from $(d_{1,0}+d_{2,1})$. Bundle adjustment helps solve all keyframe positions such that all measured links are closely satisfied.

To fix the build up of tracking errors, bundle adjustment can be performed to take account of all measured links, and perform a global optimization of each keyframe position so that all keyframe positions closely satisfy all link constraints.

The equation set up is as follows assuming the initial keyframe K0 has position $p_0 = (0,0)$:

$$\begin{bmatrix} d_{1,0} \\ d_{2,1} \\ d_{2,0} \end{bmatrix} - \begin{bmatrix} 1 & 0 \\ -1 & 1 \\ 0 & 1 \end{bmatrix} \begin{bmatrix} p_1 \\ p_2 \end{bmatrix}$$

Where the measurements $d_{1,0}$, $d_{2,1}$, $d_{2,0}$ are known and we solve for $p_1$, $p_2$ using above linear system of equations.

Objective Change Detector

Some embodiments of the present disclosure also employ an Objective Change Detector 112, which monitors each incoming frame and determines if the microscope objective has been switched, and to which magnification. It informs the controller which then takes appropriate action. It requires control of the camera exposure time to help it properly determine if an objective change has occurred.

The Objective Change Detector aims to automatically 1) detect the switching of a microscope objective lens, and 2) determine the zoom level of the new objective lens, both by processing the camera image stream only.

1) Objective lens switching detection: It is assumed that the camera images are streamed continuously at a fixed rate through the objective change detection module. The principle of detection is based on the fact that the camera view will be temporarily occluded between the switching of the objectives. Thus, the sudden darkening of the camera image is an indication of objective lens change.

Figure 18:
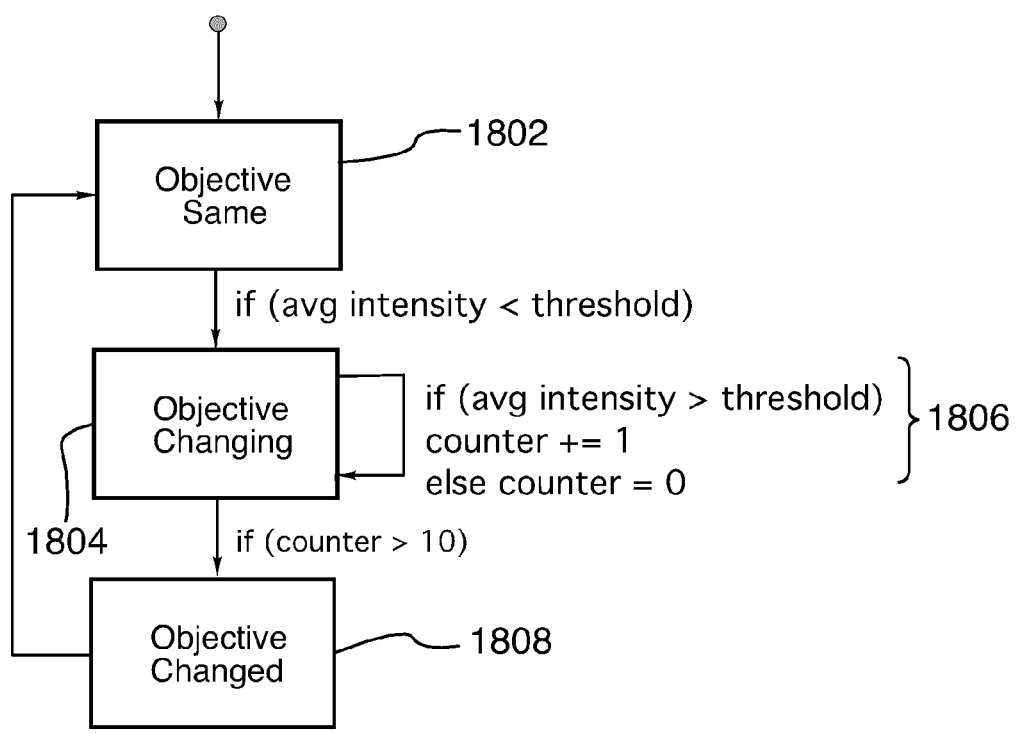
FIG. 18 is a flowchart showing an example method for objective lens switching detection functionality according to certain embodiments of the present disclosure.

The objective change detection method is presented in a flowchart in FIG. 18. To check for an occlusion the method computes the average image pixel intensity value for each incoming image at 1802. If the average image pixel intensity drops below a threshold, an occlusion is detected at 1804. The system then waits for the average image intensity value to rise above the threshold for a continuous number of frames (e.g. 10 frames) at 1806 before declaring that the objective change has been completed at 1808.

An issue occurs when switching a low zoom objective to a high zoom objective. The high zoom objective generally lets in much less light compared to the low zoom so the image remains very dark. As a result, the module may mistakenly believe that the objective is still changing. A remedy is to increase the camera shutter time to a max value when the algorithm enters the "Objective Changing" state at 1804, so that enough light could be detected for high zoom objectives.

2) Objective Zoom Detection: The objective zoom detection method follows once objective change is determined. The detection principle is based on the fact that objectives of different zooms let different amount of light through the microscope into the camera. The camera shutter time must also change with the different objectives to maintain the same image brightness. Thus, the method uses the exposure time obtained from the camera's auto-exposure algorithm to determine the objective used. The detection method is described below.

First, each of the objectives on the microscope must be calibrated to find the camera exposure time for that objective. To calibrate an objective, microscope light is set to the max and must remain constant for all objective calibrations and during actual use. There should also be no specimen on the microscope to ensure a white image. The camera's auto-exposure algorithm is then run to determine the shutter time for a white image with the current objective. This shutter time is recorded and associated with the objective. It is important to note that this recorded shutter time is the minimum shutter time that is suitable for the objective, because there is no specimen in view. If there is a specimen in view, it will obstruct some light and will cause auto-exposure time to be slightly higher.

Second, when the system is running, the system actively checks for an objective change. In the case that objective change is detected, objective zoom detection first performs auto-exposure. The resultant exposure time is compared to the calibrated exposure time for each of the objective. It is expected that a specimen may be in view, so the resultant auto-exposure time should be slightly higher than the calibrated exposure times for the objectives. Thus, the objective with the calibrated exposure time that is both lower and closest to the current exposure time is determined as the objective being used.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Also, features described herein are not necessarily limited to the particular embodiments described herein. Features from one example embodiment may be combined with other example embodiments, when possible.

The above-described embodiments are intended to be examples only. Alterations, modifications and variations can be effected to the particular embodiments by those of skill in the art without departing from the scope, which is defined solely by the claims appended hereto.

The invention claimed is:

1. A method for rendering a mosaic representation of an object from a series of image frames of the object, the method comprising:
   acquiring a current image frame of the object;
   determining a current image frame tracking position of the current image frame based on a previous image frame position of a previous image frame and a relative displacement of the current image frame from the previous image frame;
   identifying at least one neighboring keyframe within a search area defined relative to the current image frame tracking position, the at least one neighboring keyframe being one of a plurality of keyframes stored in a keyframe database, each keyframe having an associated keyframe position;
   determining relative displacements of the current image frame from each of the at least one neighboring keyframes;
   determining current image frame positions of the current image frame based on the keyframe positions of each of the at least one neighboring keyframes and the relative displacement of the current image frame from each of the at least one neighboring keyframes;
   determining a current image frame position as an average of the current image frame positions;
   storing the current image frame as a new keyframe in the keyframe database upon determining that each of the relative displacements of the current image frame from each of the at least one neighboring keyframes is greater than a threshold value;
   storing the current image frame position as a new keyframe position associated with the new keyframe in the keyframe database;
   rendering the current image frame at its current image frame position and the keyframes from the keyframe database on a display at their respective associated keyframe positions to obtain the mosaic representation of the object.

2. The method of claim 1, wherein storing the new keyframe includes:
   storing the relative displacements of the current image frame from each of the at least one neighboring keyframes.

3. The method of claim 2, further comprising:
   adjusting the keyframe positions of the plurality of keyframes to correct errors in the keyframe positions based on optimization of each keyframe position to satisfy one or more constraints on the relative displacements of each keyframe with its neighboring keyframes.

4. The method of claim 1, wherein upon failure to identify at least one neighboring keyframe within the search area or upon failure to determine the relative position of the current image frame to any neighboring keyframe, the method further comprising:
   iteratively increasing the search area to identify at least one neighboring keyframe.

5. The method of claim 4, wherein upon failure to identify at least one neighboring keyframe after iteratively increasing the search area or upon failure to determine the relative position of the current image frame to any neighboring keyframe, the method further comprising:
   assigning the current image frame position to be the current image frame tracking position or, upon failure to determine the current image frame tracking position, to be the previous image frame position.

6. The method of claim 1, further comprises identifying a set of features in each of the series of image frames by
   setting a feature strength threshold;
   obtaining a list of potential features, the list including at least one potential feature that exceeds the feature strength threshold;
   identifying the set of features in each of the series of image frames by selecting from the list of potential features only features having the maximum feature strength within a pre-defined neighborhood region.

7. The method of claim 1, wherein the relative displacement of the current image frame from the previous image frame is determined by registering the current image frame and the previous image frame based on at least one feature in the current image frame and the previous image frame.

8. The method of claim 1, wherein the relative displacements of the current image frame from each of the at least one neighboring keyframes is determined by registering the current image frame and each of the at least one keyframe based on the at least one feature in the current image frame and each of the at least one neighboring keyframes.

9. The method of claim 8, wherein registering the current image frame and each of the at least one neighboring keyframes includes:

matching a set of features identified in the current image frame with a corresponding set of features in each of the at least one neighboring keyframes to obtain a set of matched feature pairs;

selecting acceptable matched feature pairs from the set of matched feature pairs; and determining the relative displacement between the current image frame and each of the least one neighboring keyframes based on the average displacements of the acceptable matched feature pairs.

10. The method of claim 9, wherein each identified feature includes a coordinate, a descriptor row vector of N elements, N being an integer, and the matching of the set of features comprises:

comparing the descriptor row vector for each feature in the set of features identified in the current image frame with the descriptor row vector of each feature in the corresponding set of features in each of the at least one neighboring keyframes; and identifying a best-match feature in the at least one neighboring keyframe for each feature in the current image frame to form a matched feature pair, the best-match feature having the least descriptor distance from the feature in the current image frame.

11. The method of claim 9, wherein each identified feature includes a coordinate, an orientation parameter, a scale parameter, and a descriptor row vector of N elements, N being an integer, and the matching of the set of features comprises:

determining a set of match candidates for each feature in the set of features identified in the current image frame from the corresponding set of features in each of the at least one neighboring keyframes, each match candidate having its orientation parameter and scale parameter similar to that of the corresponding feature in the current image frame; and for each feature in the set of features identified in the current image frame, identifying a best-match feature in the at least one neighboring keyframe based on a match candidate from the set of match candidates having the least descriptor distance from the feature in the current image frame to form a matched feature pair.

12. The method of claim 9, further comprising:

computing a feature displacement for each matched feature pair based on their respective x-coordinates and y-coordinates;

accumulating computed feature displacements in a 2D histogram; and selecting the matched feature pairs accumulated in a bin having the highest accumulation in the 2D histogram and its neighboring bins as acceptable matched feature pairs.

13. The method of claim 9, wherein selecting acceptable matched feature pairs from the set of matched feature pairs comprises:

determining an average feature displacement from the set of matched feature pairs;

determining residual values of each matched feature pair from the average displacement;

determining the average residual value for all matched feature pairs; and selecting the matched feature pairs having a residual value less than a threshold residual value as acceptable matched feature pairs.

14. The method of claim 1, wherein rendering the keyframes further comprises:

generating a set of texture atlases, each texture atlas having an associated resolution and including at least one keyframe downsampled at the associated resolution;

selecting a display area and a display resolution for the rendering;

selecting and updating a texture atlas having a resolution closest to the display resolution from the set of texture atlases; and rendering the keyframes from the texture atlas whose associated keyframe positions are within the display area.

15. The method of claim 14, wherein updating the texture atlas further comprises:

identifying a set of keyframes from the keyframe database having associated keyframe positions within the display area and not yet in the texture atlas;

downsampling the set of keyframes at the associated resolution of the texture atlas;

and inserting the downsampled set of keyframes into the texture atlas.

16. The method of claim 1, further comprising:

upon determining that at least one of the relative displacements of the current image frame from each of the at least one neighboring keyframes is less than the threshold value, identifying at least one neighboring keyframe whose relative displacement is less than the threshold value;

determining a region of overlap between the current image frame and the at least one neighboring keyframe to obtain a region of interest in each of the current image frame and the at least one neighboring keyframe;

replacing the region of interest of the at least one neighboring keyframe with the region of interest of the current image frame when the region of interest of the current image frame is determined to be sharper than the region of interest of the one of the neighboring keyframes based on a image sharpness parameter.

17. The method of claim 16, wherein the image sharpness parameter is a gradient sum obtained from gradient images of the region of interest of the current image frame and the at least one neighboring keyframe, respectively, and the region of interest of the current image frame is determined to be sharper than the region of interest of the one of the neighboring keyframes when the gradient sum of the region of interest of the current image frame is greater than that of the one of the neighboring keyframes.

18. The method of claim 16, wherein replacing the region of interest of the at least one neighboring keyframe includes overwriting contents of the region of interest of the at least one neighboring keyframe with that contents of the region of interest of the current image frame.

19. The method of claim 16, further comprising blending contents at the boundaries of the region of interest of the current image frame with those of the at least one neighboring keyframe.

20. The method of claim 1, further comprising:

assigning each keyframe in the keyframe database to one of a plurality of cells based on its associated keyframe position; and tagging each keyframe to map its associated keyframe position and its respective assigned cell.

21. The method of claim 20, wherein the plurality of cells are aligned in a grid and the cells are indexed using a 2-dimensional index.

22. The method of claim 21, wherein the search area comprises at least one or more indexed cells.

23. The method of claim 1, wherein the rendering of the mosaic representation of the object includes rendering mosaic representations obtained from different magnification objectives, and the method further comprises:
  maintaining a separate keyframe database associated with each magnification objective;
  associating the mosaic representations obtained from each magnification objective based on a relative displacement of respective objective optical centers; and
  rendering a combined mosaic representation of the object based on the associated mosaic representations.

24. The method of claim 1, further comprising:
  pre-processing the current image frame, the pre-processing including image calibration to correct illumination variance across a field of view, conversion of color scales to a grayscale, downsampling, feature detection, or gradient computation.

25. The method of claim 1, wherein rendering the keyframes comprises blending of overlapping keyframes.

26. The method of claim 25, wherein blending of overlapping keyframes includes
  decomposing keyframes into a plurality of bands;
  blending the plurality of bands; and
  merging the blended plurality of bands to obtain the mosaic representation of the object.

27. The method of claim 26, wherein decomposing keyframes is based on spatial frequency.

28. The method of claim 1, further comprising
  adjusting the gain of the current image frame to a substantially uniform level of brightness by comparing against the gains of the plurality of keyframes.

29. The method of claim 1, further comprising
  detecting a occlusion in the current image frame based on an average image pixel intensity falling below a threshold intensity value; and
  detecting a change in an exposure time of subsequent image frames
  to determine a change in objective lens used for acquiring image frames.

30. The method of claim 1, wherein a first image frame in the series of image frames is assigned as a reference keyframe having a reference keyframe position.

31. An imaging system comprising:
  an image acquisition module to acquire a current image frame of an object;
  a processor configured to:
    determine a current image frame tracking position of the current image frame based on a previous image frame position of a previous image frame and a relative displacement of the current image frame from the previous image frame;
    identify at least one neighboring keyframe within a search area defined relative to the current image frame tracking position, the at least one neighboring keyframe being one of a plurality of keyframes stored in a keyframe database, each keyframe having an associated keyframe position;
    determine relative displacements of the current image frame from each of the at least one neighboring keyframes;
    determine current image frame positions of the current image frame from the associated keyframe frame position of each of the at least one neighboring keyframes and the relative displacement of the current image frame from each of the at least one neighboring keyframes;
    determine a current image frame position as an average of the current image frame positions;
    store the current image frame as a new keyframe in the keyframe database upon determining that each of the relative displacements of the current image frame from each of the at least one neighboring keyframes is greater than a threshold value;
    store the current image frame position as a new keyframe position associated with the new keyframe in the keyframe database; and,
  a renderer to render the current image frame at its current image frame position and the keyframes from the keyframe database on a display at their respective associated keyframe positions to display a mosaic representation of the object.

32. The imaging system of claim 31, further comprising:
  a controller to receive input from an input device or the processor to control the image acquisition module or the renderer in response to the received inputs,
  and the image acquisition module includes
    a microscope having at least one objective; and
    a video camera for acquiring a series of image frames of the object.

33. A computer program product comprising a non-transitory computer-readable memory storing computer executable instructions thereon that when executed by a computer perform the method of claim 1.

34. A method for generating keyframes from a series of image frames of an object for rendering a mosaic representation of the object, the method comprising:
  determining a current image frame tracking position based on a displacement of a current image frame relative to known position of a previous image frame;
  identifying at least one neighboring keyframe within a predetermined search area surrounding the current image frame tracking position;
  determining a current position of the current image frame relative to each of the at least one neighboring keyframe based on known respective keyframes positions of each of the at least one neighboring keyframes and relative displacements of the current image frame from each of the at least one neighboring keyframes;
storing the current image frame as a new keyframe when the relative displacements of the current image frame from each of the at least one neighboring keyframes is greater than a threshold value.

35. A method of registering a first image and a second image comprising:
  identifying a set of features in the first image and a corresponding set of features in the second image, each identified feature including a coordinate, an orientation parameter, a scale parameter, and a descriptor row vector of N elements, N being an integer;
  determining a set of match candidates for each feature in the set of features of the first image frame from the corresponding set of features in the second image frame, each match candidate having its orientation parameter and scale parameter similar to that of the corresponding feature in the first image frame;
  for each feature in the set of features of the first image, determining a best-match candidate from the set of match candidates, the best-match candidate having the least descriptor distance from the feature in the first image, to form a matched feature pair;
  computing a feature displacement for each matched feature pair based on their respective x-coordinates and y-coordinates;

accumulating the computed feature displacements in a 2D histogram;
selecting the matched feature pairs accumulated in a bin having the highest accumulation in the 2D histogram and in its neighboring bins;
determining an average feature displacement from the selected matched feature pairs;
determining the residual values of each selected matched feature pair from the average feature displacement;
determining the average residual value from all selected matched feature pairs;
retaining matched feature pairs having a residual value less than a threshold factor of the average residual value as acceptable matched feature pairs; and
determining average displacement between the first image and the second image based on the relative displacement of the acceptable matched feature pairs for image registration.

* * * * *